United States Patent
Tatsuo et al.

(10) Patent No.: US 6,750,878 B1
(45) Date of Patent: Jun. 15, 2004

(54) INFORMATION DISPLAY DEVICE FOR DISPLAYING GUIDANCE INFORMATION ON STATUS OF OPERATION

(75) Inventors: Nomura Tatsuo, Souraku-gun (JP); Fukuda Kohki, Nara (JP); Yoshiura Syoichiro, Tenri (JP); Itoh Akihiko, Nara (JP); Hasegawa Keiichi, Souraku-gun (JP)

(73) Assignee: Sharp Kabushiki Kaisha, Osaka (JP)

( * ) Notice: Subject to any disclaimer, the term of this patent is extended or adjusted under 35 U.S.C. 154(b) by 365 days.

(21) Appl. No.: 09/603,011

(22) Filed: Jun. 26, 2000

(30) Foreign Application Priority Data

Jul. 1, 1999 (JP) .............................. 11-187362

(51) Int. Cl.$^7$ ................................ G09G 5/00
(52) U.S. Cl. ................. 345/705; 345/772; 345/790; 399/81
(58) Field of Search ................. 345/700, 705–715, 345/733, 740, 764, 771–772, 781, 788, 790, 798–801, 810, 821, 823, 835, 629, 634, 636, 660, 667, 671, 473; 399/81–83

(56) References Cited

U.S. PATENT DOCUMENTS

| | | | | |
|---|---|---|---|---|
| 4,682,158 A | * | 7/1987 | Ito et al. ..................... | 340/679 |
| 5,353,391 A | * | 10/1994 | Cohen et al. ................ | 345/619 |
| 5,583,617 A | * | 12/1996 | Altrieth et al. .............. | 399/81 |
| 5,602,625 A | | 2/1997 | Okamoto et al. ............ | 399/21 |
| 5,781,191 A | * | 7/1998 | Mayuzumi et al. .......... | 345/705 |
| 5,877,961 A | * | 3/1999 | Moore ......................... | 700/180 |
| 5,950,045 A | * | 9/1999 | Nomura et al. .............. | 399/81 |
| 6,421,509 B1 | * | 7/2002 | Nomura et al. .............. | 399/81 |

FOREIGN PATENT DOCUMENTS

| | | |
|---|---|---|
| JP | 11-15400 | 1/1999 |
| JP | 11-134156 | 5/1999 |
| JP | 11-134160 | 5/1999 |

* cited by examiner

*Primary Examiner*—Sy D. Luu
(74) *Attorney, Agent, or Firm*—David C. Conlin; David A. Tucker; Edwards & Angell, LLP

(57) ABSTRACT

An operation panel includes a mode which can selectively set the display form, whether new image information is formed by a dynamic image forming section, and a plurality of static image information are sequentially displayed in a display section together with static image information controlled in a guidance information control section, to thereby display for guidance to a user as continuous guidance image information, or the static image information controlled in the guidance information control section is displayed for guidance to a user as guidance image information.

30 Claims, 28 Drawing Sheets

Fig.7
Display image information
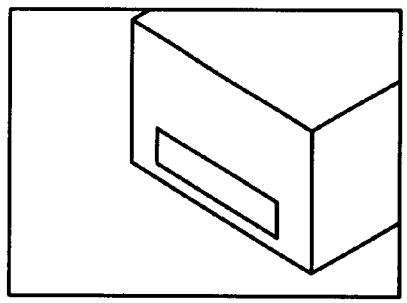
(a)
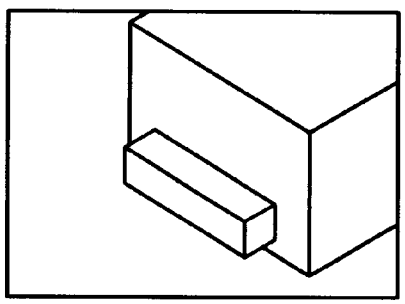
(b)
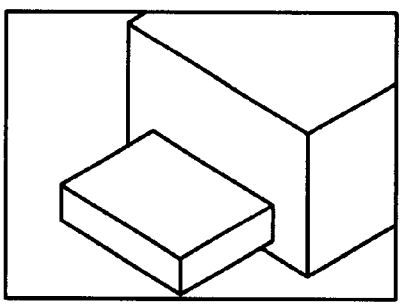
(c)
Interpolated image information
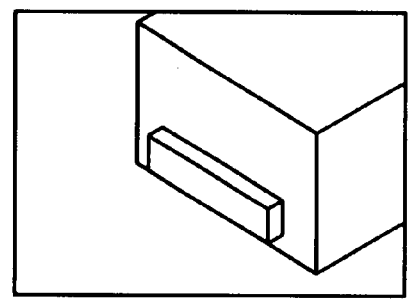
(d)
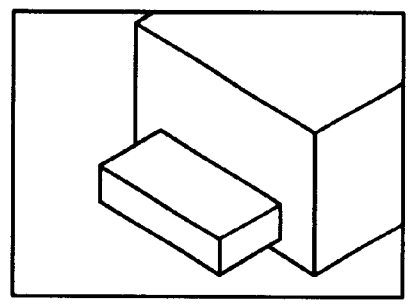
(e)

Fig.8
Background image information
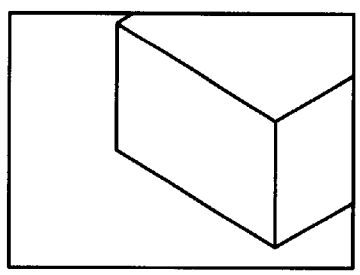
(a)
Display image information
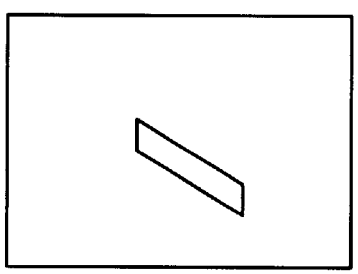
(b)
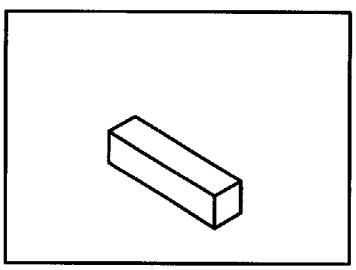
(c)
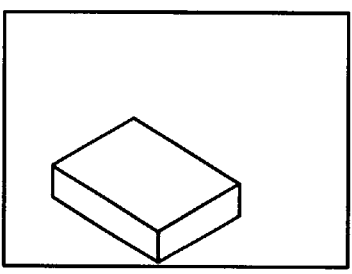
(d)
Interpolated image information
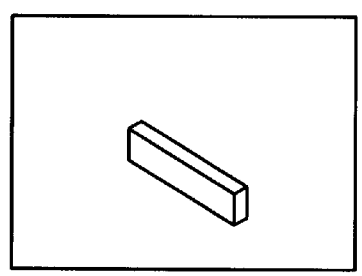
(e)
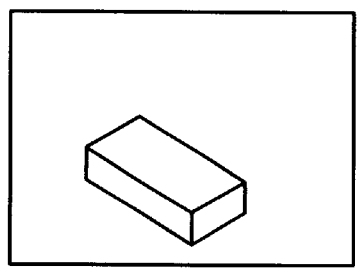
(f)

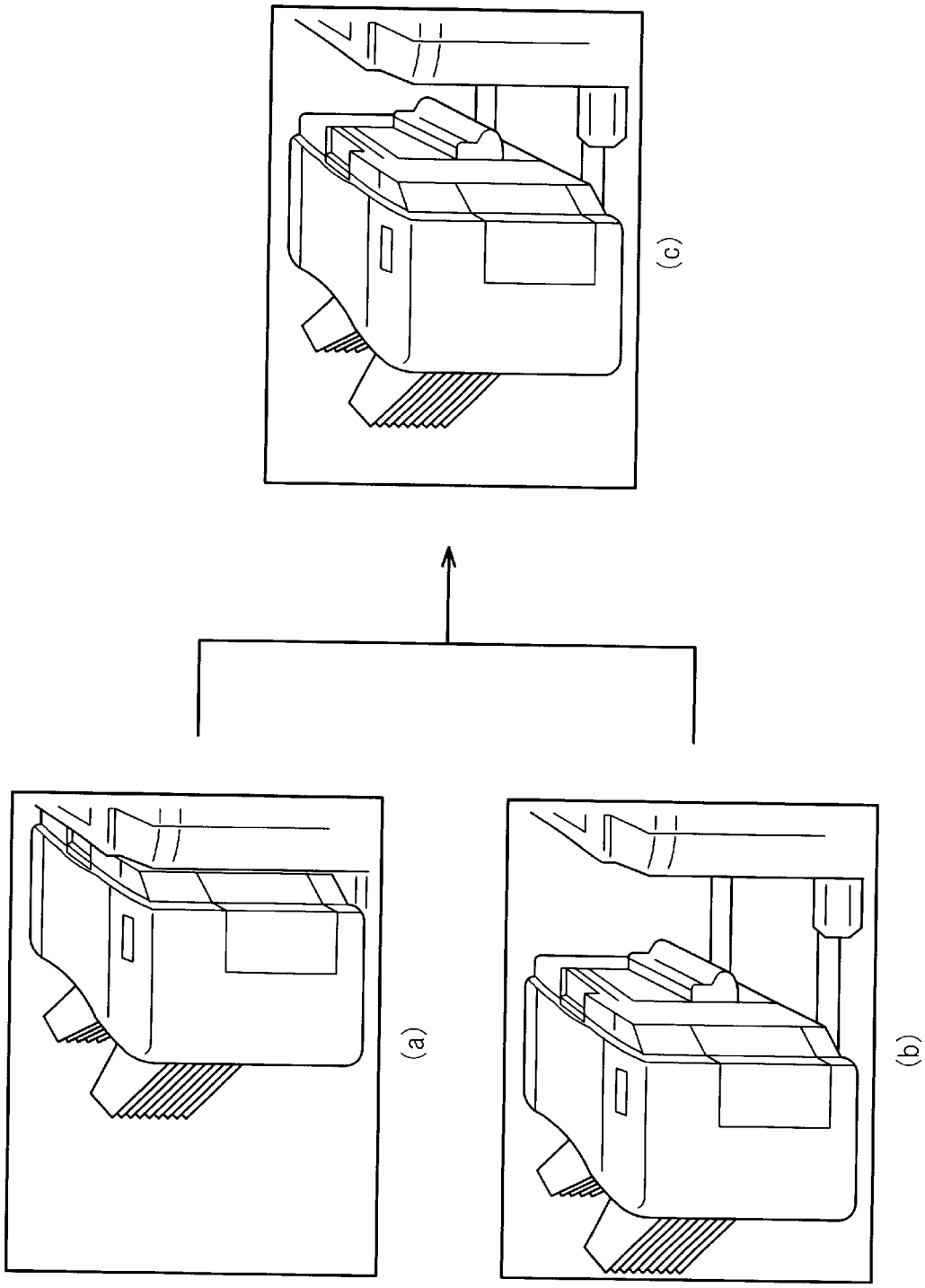

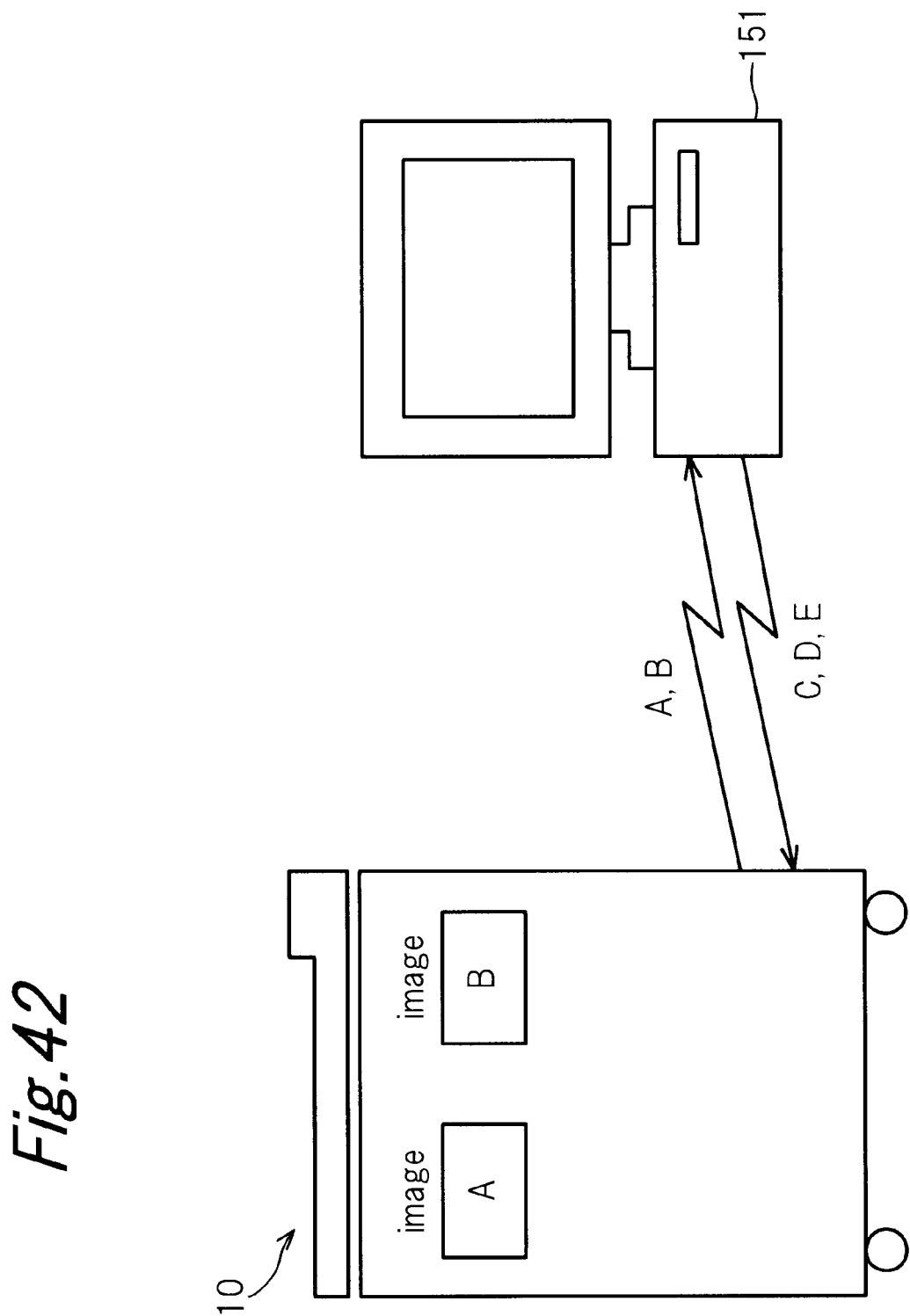

INFORMATION DISPLAY DEVICE FOR DISPLAYING GUIDANCE INFORMATION ON STATUS OF OPERATION

BACKGROUND OF THE INVENTION (1) Field of the Invention

The present invention relates to an information display device used in an image forming apparatus such as a copying machine, a FAX machine or the like, and having a function of displaying operation procedure information for guidance with an image or the like.

(2) Description of the Prior Art

High-function and high-performance copying machines have been commercialized to meet the demand in the market, on the other hand, however, the construction of the apparatus becomes complicated, and there is a possibility that the apparatus becomes difficult to use for persons who do not use it very often.

Moreover, in convenience stores and the like, a copying machine is provided as a copying service, and anyone who has not utilized it before can use it very easily. Here, it should be provided as an apparatus which can be used easily by anyone.

In such situations, copying machines which mount a big display device in an operation panel, and has a function of kindly informing the procedure information with pictures, messages or the like have been recently commercialized. Thereby, these apparatus can be utilized at ease by providing an user information such as pictures and messages regarding many devices on a big display section, so as to be easy to understand.

However, if lots of guidance information is to be displayed on a big display section so as to be easy to understand, it is necessary to prepare in advance lots of display image information, increasing the capacity of a memory for storing the display image information to thereby impose a large burden thereon in terms of cost. On the other hand, if the display information displayed on the display device is simplified (reduced), the guidance information becomes here and there to be difficult to understand, and there will be no sense in mounting a big display device.

The present inventor has disclosed a display device, in Japanese Patent Application Laid-Open Hei 11 No. 15400, Japanese Patent Application Laid-Open Hei 11 No. 134160 and Japanese Patent Application Laid-Open Hei 11 No. 134156, wherein a large liquid-crystal display panel is mounted on an operation panel so as to display a sketch drawing of the device and peripheral devices approximately in the central portion thereof and information regarding the devices in the vicinity thereof, and when a status change of the device occurs, the information to be transmitted to a user is displayed on the display device as image information including message information, while sequentially changing the display, to thereby lead the user. However, with this device, there is a possibility that a user who does not understand the device sufficiently may be confused, when the screen display information that has been displayed is changed over to new screen display information.

SUMMARY OF THE INVENTION

It is therefore an object of the present invention to provide a low price information display device which can reliably display for guidance information to be transmitted, without increasing the capacity of a memory for storing the image information.

With a view to achieving the above object, the gist of the present invention is constituted as follows.

A first gist of the present invention is an information display device comprising: a display section for displaying guidance information of operation to an operator, regarding an equipment to be operated; a guidance information control section for storing and controlling a plurality of the guidance information to be displayed on the display section; and a display control section for selectively displaying the guidance information controlled in the guidance information control section on the display section.

The guidance information is characterized in that it includes a sketch drawing of the equipment to be operated and status information representing a status change of the equipment to be operated, and when a status change occurs in the equipment to be operated, the display control section displays the status information with respect to the status change, by overlapping the status information on a portion of the sketch drawing where the status change occurred.

According to the first gist of the present invention, a sketch drawing of an equipment to be operated and status information representing a status change of the equipment to be operated are displayed on the display section. Here, the status information is message and image information showing the status and operation of the equipment to be operated. When a change occurs in the status of the equipment to be operated, the status information is overlapped and displayed on a portion of the sketch drawing where the status change occurred. Hence, an operator can easily understand in which portion a status change occurred. Therefore, the operator can easily understand which operation should be performed.

A second gist of the present invention is an information display device according to the first invention, characterized in that the display control section displays the status information so as to leave at least a part of the sketch drawing.

According to the second gist of the present invention, by displaying the status information so as to leave a part of the sketch drawing, the sketch drawing is not hidden by the status information, and it becomes easy to confirm which part of the equipment to be operated the status information shows.

A third gist of the present invention is an information display device comprising: a display section for displaying guidance information of operation to an operator, regarding an equipment to be operated; a guidance information control section for storing and controlling a plurality of the guidance information to be displayed on the display section; and a display control section for selectively displaying the guidance information controlled in the guidance information control section on the display section.

The guidance information is characterized in that it includes a sketch drawing of the equipment to be operated and status information representing a status change of the equipment to be operated, and when a status change occurs in the equipment to be operated, the display control section displays the status information with respect to the status change in the vicinity of a portion of the sketch drawing where the status change occurred.

According to the third gist of the present invention, by displaying the status information in the vicinity of a portion of the sketch drawing where the status change occurred, the portion of the sketch drawing corresponding to the status information can be seen by an operator. Hence, the operator can easily confirm which portion of the equipment to be operated the status information shows.

A fourth gist of the present invention is an information display device according to the first or third gist, characterized in that the status information is a partially enlarged diagram of a portion of the device where a status change occurred.

According to the fourth gist of the present invention, since the status information is a partially enlarged diagram of a portion of the device where a status change occurred, it is quite obvious to the operator what is the status information, and the operator can easily understand.

A fifth gist of the present invention is an information display device according to the first or third gist, characterized in that the status information is a plurality of transition display information regarding a method of handling the portion where the status change occurred, and the plurality of transition display information are transitionally displayed approximately in the same position in the sketch drawing.

A sixth gist of the present invention is an information display device according to the fourth gist, characterized in that the status information is a plurality of transition display information regarding a method of handling the portion where the status change occurred, and the plurality of transition display information are transitionally displayed approximately in the same position in the sketch drawing.

According to the fifth and sixth gist of the present invention, since the plurality of transition display information, that is, the status information showing the handling method is transitionally displayed approximately in the same position in the sketch drawing, the handling procedure and the status change are displayed in a state of dynamic image to the operator, making it easy to understand for the operator how to handle it.

A seventh gist of the present invention is an information display device according to the first or third gist, characterized in that the sketch drawing is maintained and displayed in a predetermined position on a display screen area of the display section.

An eighth gist of the present invention is an information display device according to the fourth gist, characterized in that the sketch drawing is maintained and displayed in a predetermined position on a display screen area of the display section.

A ninth gist of the present invention is an information display device according to the fifth gist, characterized in that the sketch drawing is maintained and displayed in a predetermined position on a display screen area of the display section.

According to the seventh to ninth gist of the present invention, the sketch drawing is maintained and displayed in a predetermined position on the display screen area of the display section, and is not moved. Therefore, if the position is moved even in the same sketch drawing, an operator tends to confirm if there is any change, but since there is no movement in the position, it is not necessary for the operator to perform such wasteful confirmation. Moreover, when the status information is displayed, the operation can confirm the portion immediately.

A tenth gist of the present invention is an information display device according to the first or third gist, characterized in that the display forms of the sketch drawing and the status information are respectively different.

An eleventh gist of the present invention is an information display device according to the fourth gist, characterized in that the display forms of the sketch drawing and the status information are respectively different.

A twelfth gist of the present invention is an information display device according to the fifth gist, characterized in that the display forms of the sketch drawing and the status information are respectively different.

According to the tenth to twelfth gist of the present invention, by displaying the sketch drawing and the status information in a different display form (color, density, etc.), these can be easily identified. Hence, the operator can quickly understand the position and the content of the status information.

A thirteenth gist of the present invention is an information display device according to the tenth gist, characterized in that the status information is displayed on the display section in a state of being emphasized than the sketch drawing.

A fourteenth gist of the present invention is an information display device according to the eleventh or twelfth gist, characterized in that the status information is displayed on the display section in a state of being emphasized than the sketch drawing.

According to the thirteenth and fourteenth gist of the present invention, the status information is displayed on the display section in a state of being emphasized than the sketch drawing, so that the operator can easily identify it.

A fifteenth gist of the present invention is an information display device according to the tenth gist, characterized in that the difference of the display form on the display section of the sketch drawing and the status information can be optionally set.

A sixteenth gist of the present invention is an information display device according to the eleventh or twelfth gist, characterized in that the difference of the display form on the display section of the sketch drawing and the status information can be optionally set.

According to the fifteenth and sixteenth gist of the present invention, the difference of the display form on the display section of the sketch drawing and the status information can be optionally set, depending upon the environment of the place where the apparatus is installed, such as the level of a person who uses the device (the understanding level of the device), etc.

A seventeenth gist of the present invention is an information display device comprising: a display section for displaying guidance information of operation to an operator, regarding an equipment to be operated, including a plurality of image information showing a status change of the equipment to be operated; a guidance information control section for storing and controlling the guidance information to be displayed on the display section; an image forming section for forming, from at least two static image information showing a status change of the equipment to be operated, at least one interpolated image information corresponding to the state during the status change; and a display control section for selectively displaying on the display section, the guidance information controlled in the guidance information control section and the image information formed in the image forming section. It is characterized in that a series of operation procedure can be informed by displaying the image information sequentially in response to the operation of an operator.

According to the seventeenth gist of the present invention, the image forming section forms, from two static image information, at least one interpolated image information corresponding to the state during the status change, and displays the image information sequentially, in response to the operation of the operator, to thereby enable display of the information regarding the device in a dynamic image. The operator has only to perform operation in accordance with the information, hence the operability is improved.

Moreover, since this operation can be accomplished by using a memory area for controlling the static image serving as a point and a work memory area for temporarily storing the image formed from the static image, the total memory capacity can be made small.

An eighteenth gist of the present invention is an information display device according to the seventeenth gist, characterized in that the guidance information control section stores and controls static image information in which the display position of a portion not interpolated and displaced is fixed and the display position of a displaced portion is changed in the image forming section.

According to the eighteenth gist of the present invention, the static image information controlled in the guidance information control section fixes the display position of a portion not interpolated and displaced and changes the display position of a displaced portion. Therefore, the formed image can be obtained only by changing the display position of the displaced portion, making the movement smooth. Since the image forming section has only to perform processing of the portion where the position thereof changes, processing of image formation becomes simple, enabling improvement of the processing speed.

A nineteenth gist of the present invention is an information display device according to the seventeenth gist, characterized in that the guidance information control section controls the information by dividing them into background image information in which there is no change on the display position, and changed image information in which the display position changes, and the image forming section forms at least one interpolated image information from at least two changed image information, corresponding to the state during the change, and synthesizes the interpolated image information with the background image information.

According to the nineteenth gist of the present invention, by utilizing the background image information controlled in the guidance information control section and the changed image information, the image forming section forms at least one interpolated image information from the changed image information, corresponding to the state during the change, and synthesizes the interpolated image information with the background image information. Therefore, the guidance information control section has only to store the background image information and the changed image in the memory, and there is no need to store the interpolated image information, hence the memory capacity can be made small.

A twentieth gist of the present invention is an information display device according to the seventeenth gist, characterized in that the guidance information control section controls the information by dividing them into background image information in which there is no change on the display position, and displacement data of a portion where the display position changes, and the image forming section forms a partially interpolated image information representing the displaced state, based on the displacement data, and synthesizes the partially interpolated image information and the background image information.

According to the twentieth gist of the present invention, the guidance information control section controls the information by dividing them into background image information in which there is no change on the display position, and displacement data of a portion where the display position changes. The displacement data refers to data regarding movement (displacement) of partial image information, such as direction of movement of the display position and distance of movement of the display position. Therefore, the guidance information control section has only to store the background image information and the displacement data in the memory, and there is no need to store the interpolated image information, enabling reduction of the memory capacity.

A twenty-first gist of the present invention is an information display device according to the seventeenth gist, characterized in that a guidance information control section is provided also in a peripheral equipment connected to the equipment to be operated, and the peripheral guidance information control section controls at least two static image information showing a status change of the peripheral equipment, and the image forming section forms at least one image information corresponding to the image during the status change from the the at least two image information.

According to the twenty-first gist of the present invention, a guidance information control section is provided also in a peripheral equipment, and the peripheral guidance information control section stores and controls static image information. Therefore, when the peripheral equipment is connected to the equipment to be operated, the static image stored and controlled in the peripheral guidance information control section is sent out to the image forming section, and the image forming section forms an interpolated image based on the static image. Hence, the equipment to be operated does not need to control the image regarding the peripheral equipment, and has only to control the static image regarding the equipment to be operated, enabling reduction of the memory capacity.

A twenty-second gist of the present invention is an information display device according to the twenty-first gist, characterized in that the static image information controlled in the peripheral guidance information control section is image information including the equipment to be operated and a peripheral equipment.

According to the twenty-second gist of the present invention, the static image information controlled in the peripheral guidance information control section is image information including image information of the equipment to be operated and a peripheral equipment, therefore, with regard to a peripheral equipment added as an option, it is not necessary to take out the image information thereof from the guidance information control section of the equipment to be operated. The image formation can be performed using the static image information controlled in the peripheral guidance information control section. Hence, it becomes possible to display for guidance with a simple processing, using appropriate display image information.

A twenty-third gist of the present invention is an information display device according to the twenty-first gist, characterized in that the static image information controlled in the peripheral guidance information control section is preferentially displayed as new image information, without invalidating the image information corresponding to the equivalent portion controlled in the guidance information control section.

According to the twenty-third gist of the present invention, the peripheral equipment added as the option can be attached to or detached from the equipment to be operated. Since the static image information controlled in the peripheral guidance information control section is preferentially displayed as new image information, without invalidating the image information corresponding to the equivalent portion controlled in the guidance information control section, even if the peripheral equipment is detached therefrom, only the static image information of the peripheral equipment is deleted, so that the dynamic image display can be performed by the equipment to be operated alone.

A twenty-fourth gist of the present invention is an information display device according to any one of the first, third or seventeenth gist, characterized in that the guidance information control section is provided in the equipment to be operated, the image forming section is provided outside of the equipment to be operated, and the image information in the guidance information control section is transmitted to the image forming apparatus to thereby form an image.

According to the twenty-fourth gist of the present invention, the image forming section is, for example, a personal computer or a host computer, provided outside of the equipment to be operated. Therefore, it is not necessary to install the image forming section in the equipment to be operated, enabling reduction of the number of parts, and hence reduction in cost. Moreover, since a dedicated image forming section is provided externally, a burden on the operation processing of the equipment to be operated can be reduced, enabling improvement of the processing efficiency. Furthermore, since a dedicated processing apparatus is used for image forming, the operational efficiency can be improved, and correspondence for each model of the equipment to be operated can be effected.

A twenty-fifth gist of the present invention is an information display device according to any one of the first, third or seventeenth gist, characterized in that the display control section is provided with a first information display mode for displaying only the information controlled in the guidance information control section on the display section, and a second information display mode for displaying the information including the image information formed by the image forming section on the display section, thereby enabling selection of one of these.

A twenty-sixth gist of the present invention is an information display device according to the twenty-fourth gist, characterized in that the display control section is provided with a first information display mode for displaying only the information controlled in the guidance information control section on the display section, and a second information display mode for displaying the information including the image information formed by the image forming section on the display section, thereby enabling selection of one of these.

According to the twenty-fifth and twenty-sixth gist of the present invention, it is possible to select information guidance by section of a static image or information guidance by section of a dynamic image, in compliance with the demands of the operator. Therefore, depending upon the preference of the operator or the environment of the place where the apparatus is installed, it becomes possible to change the display form of the information displayed for guidance on the display section on the operation panel.

A twenty-seventh gist of the present invention is an information display device according to any one of the first, third or seventeenth gist, characterized in that the image forming section is constituted so as to be added as an extended unit, and hence can be additionally operated selectively.

A twenty-eighth gist of the present invention is an information display device according to the twenty-fourth gist, characterized in that the image forming section is constituted so as to be added as an extended unit, and hence can be additionally operated selectively.

A twenty-ninth gist of the present invention is an information display device according to the twenty-fifth gist, characterized in that the image forming section is constituted so as to be added as an extended unit, and hence can be additionally operated selectively.

A thirtieth gist of the present invention is an information display device according to the twenty-sixth gist, characterized in that the image forming section is constituted so as to be added as an extended unit, and hence can be additionally operated selectively.

According to the twenty-seventh to the thirtieth gist of the present invention, since the image forming section is constituted so as to be added as an extended unit, and can be additionally operated selectively, it becomes possible to change the display form of the information displayed for guidance on the display section on the operation panel, depending upon the environment of the place where the apparatus is installed and/or the demands of a user. It is possible to change the information guidance by section of a static image to the information guidance by section of a dynamic image, depending upon the demands of a user, to thereby display the information for guidance, so as to be easy to understand and to eliminate a feeling of being hard to deal with the device.

BRIEF DESCRIPTION OF THE DRAWINGS

FIG. 7 is a schematic diagram illustrating one method of forming an interpolated guidance image information from a guidance image information in a static image.

FIG. 8 is a schematic diagram illustrating another method of forming an interpolated guidance image information from a guidance image information in a static image.

FIG. 9 is a schematic diagram illustrating the formation of an interpolated image from an image controlled in an information control section of a post-processing unit.

FIG. 42 is a schematic diagram of connecting a personal computer to a digital copying machine to process the image data.

DESCRIPTION OF THE PREFERRED EMBODIMENTS

As follows is a description of embodiments of the present invention with reference to the accompanying drawings.

Figure 1:
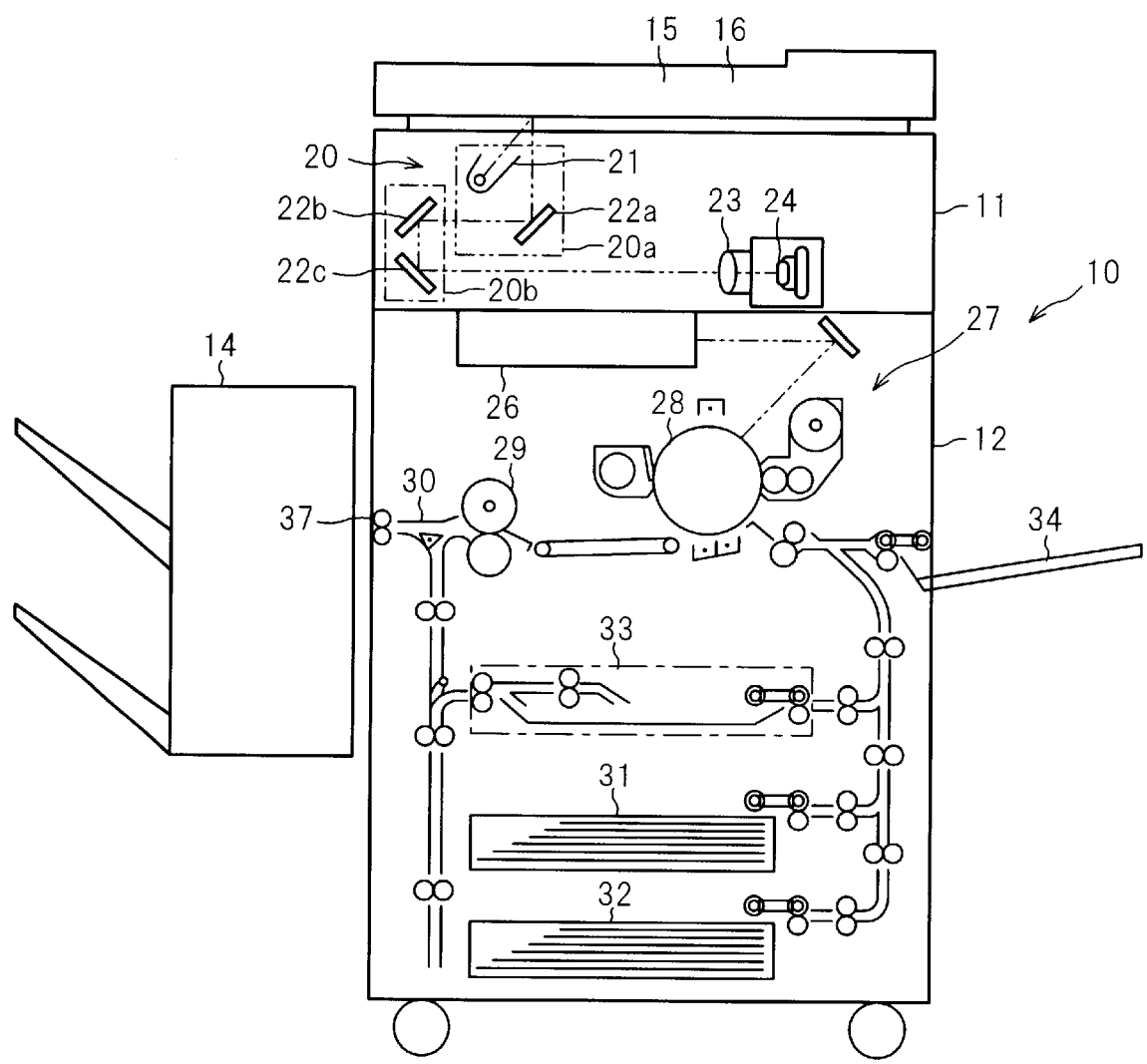
FIG. 1 is a sectional view showing the overall construction of a digital image forming apparatus comprising an operation panel.

This embodiment is a digital image forming apparatus having, for example, a copying mode, a printer mode, a fax mode or the like. FIG. 1 is a sectional view showing the overall construction of the digital image forming apparatus comprising an operation panel. The image forming apparatus is a digital copying machine 10, and the digital copying machine 10 is largely divided into two portions and constituted of a scanner section 11 for reading a document image, and a laser printer section 12 for forming an image and recording the image on a sheet of paper or the like.

The scanner section 11 is constituted of an original table 15 comprising a transparent glass, a reversing automatic document feeder (RADF) 16 for automatically feeding and carrying a document to the original table 15, and an original image reading unit for scanning and reading an image on the document placed on the original table 15, that is, a scanner unit 20. The original image read by the scanner section 11 is sent to an image data input section described later as image data, and the image data is then subjected to a predetermined image processing.

The above-described RADF 16 is a device in which a plurality of documents are set at a time on an unillustrated original tray provided therein, for automatically feeding an original set thereon one by one to the original table 15 in the scanner unit 20. Moreover, the RADF 16 is constituted of a carrier route for a one-sided document, a carrier route for a two-sided document, a carrier route change over means, a center group for understanding and controlling the conditions of the document passing through the respective sections, and a control section. The RADF 16 has heretofore been described in many applications and commercialized, hence more detailed description thereof is omitted.

The scanner unit 20 constituting the scanner section 11 for reading an image on an original document on the original table 15 comprises: a lamp reflector assembly 21 for exposing on an original face; a first scanning unit 20a comprising a first reflection mirror 22a mounted thereon for reflecting a reflected light from the document, for guiding the reflected light image from the document to a photoelectric conversion element (CCD 24); a second scanning unit 20b comprising second and third reflection mirrors 22b, 22c mounted thereon for guiding a reflected light image from the first reflection mirror 22a to the CCD 24; an optical lens 23 for imaging the reflected light image from the document on the CCD 24 which converts the reflected light image into an electric image signal, via respective reflection mirrors; and the above-described CCD 24 for converting the reflected light image from the document into an electric image signal.

The scanner section 11 is constructed such that while a document to be read is sequentially placed on the original table 15 by means of the associated operation of the RADF 16 and the scanner unit 20, the scanner unit 20 is moved along the lower face of the original table 15 to thereby read the original image. In particular, the first scanning unit 20a is traveled from left to right along the original table 15 at a certain velocity V, and the second scanning unit 20b is controlled so as to scan in parallel in the same direction at a velocity of V/2, relative to the velocity V of the first scanning unit 20a. Thereby, the image of the document placed on the original table 15 is imaged onto the CCD 24 sequentially line by line and is read.

The image data obtained by reading the original image by the scanner unit 20 is transmitted to an image processing section described later, and subjected to various processing. Thereafter, the original image is temporarily stored in a memory in the image processing section. The image in the memory is read in response to the output instruction, and transferred to the laser printer section 12, to thereby form an image on a recording sheet. The laser printer section 12 comprises a carrier system of sheet serving as a recording material for forming an image thereon, and an image forming section 27 for forming an image. The image forming section 27 comprises a laser write unit 26 and an electronic photograph process section 28 for forming an image.

The laser write unit 26 has: a semiconductor laser source for emitting a laser beam depending upon the image data read from the memory after having been read by the above-described scanner unit 20 or the image data transferred from an external device; a polygon mirror for deflecting the laser beam at an isometric speed; and a f-θ lens for correcting so that the laser beam deflected at an isometric speed is deflected at an isometric speed on a photosensitive drum constituting the electronic photograph process section 28.

The above-described electronic photograph process section 28 comprises a charger, a developing device, a transfer device, a stripper, a cleaner and a discharger, around the well known photosensitive drum.

On the other hand, the carrier system of sheet comprises: a carrier section for carrying a sheet P to a transfer position, in particular, where the transfer device is disposed, in the electronic photograph process section 28 described above for forming an image; a cassette paper feeder 31, 32 for feeding the sheet P to the carrier section, or a manual paper feeder 34 for properly feeding a sheet in a required size; a fixing device 29 for fixing an image formed on the transferred sheet P, in particular, for fixing a toner image; and a refeeding route 33 for re-feeding the sheet P for forming an image again on the back face of the sheet P after fixation.

Moreover, on the downstream side of the fixing device 29, there is arranged a post-processing unit 14 for receiving the sheet P on which the image is recorded, and subjecting the sheet P to a predetermined processing.

In the laser write unit 26 and the electronic photograph process section 28 in the image forming section 27, the image data read from the image memory is formed as an electrostatic latent image on the surface of the photosensitive drum serving as the electronic photograph process section 28, by being scanned with the laser beam by the laser write unit 26. The toner image which has been turned into a visible image by a toner is electrostatically transferred onto and fixed on the face of the paper carried from any one of the paper feed section of the multi-stage paper feed unit.

The paper on which the image has been formed in this manner is carried from the fixing device 29 through the paper ejection roller 37 to the post-processing unit 14.

Next is a description of the construction and function of the image processing section which performs image processing on the read out original image information in the digital copying machine 10.

Figure 2:
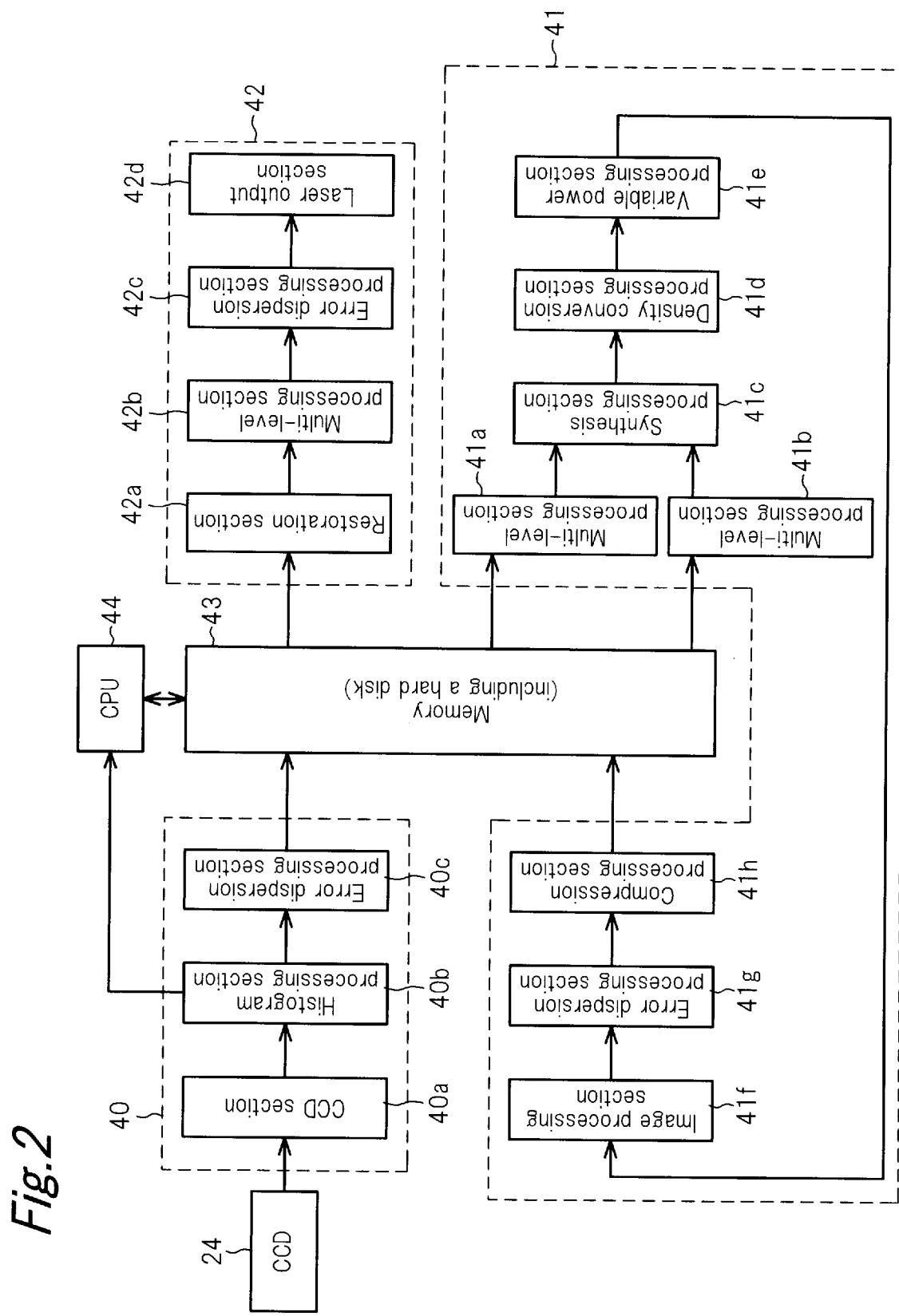
FIG. 2 is a block diagram of an image processing section included in a digital copying machine 10 of FIG. 1.

FIG. 2 is a block diagram of the image processing section included in the digital copying machine 10 of FIG. 1. The image processing section comprises an image data input section 40, an image processing section 41, an image data output section 42, a memory 43 constituted of a RAM (random access memory), a hard disk or the like, and a central processing unit (CPU) 44.

The image data input section 40 includes a CCD section 40a, a histogram processing section 40b, and an error dispersion processing section 40c. The image data input section 40 is constructed such that it converts the image data of the original document read from the CCD 24 into digital data, processes the image data by means of an error dispersion method, while making a histogram as a digital volume having a digital value, and stores the image data in the memory 43 for a while. That is to say, with the CCD section 40a, after having been A/D converted, an analog electric signal depending upon each pixel density of the image data is subjected to MMT correction, and black and white correction or gamma correction, and is output to the histogram processing section 40b as a digital signal of 256 gradations (8 bits).

With the histogram processing section 40b, the digital signal output from the CCD section 40a is added for each pixel density of 256 gradations to thereby obtain density information (histogram data), as well as the obtained histogram data is sent to the CPU 44, according to need, and then sent to the error dispersion processing section 40c as pixel data.

With the error dispersion processing section 40c, by the error dispersion method which is one kind of pseudo-intermediate processing, that is, a method in which a binarization error is reflected in the binarization judgement of the adjacent pixel, the digital signal of 8 bits/pixel output from the CCD section 40a is converted into one bit (binarization), and redistribution operation for reproducing with fidelity the local area density in the original document is performed.

The image processing section 41 includes: a multi-level processing section 41a, 41b; a synthesis processing section 41c; a density conversion processing section 41d; a variable power processing section 41e; an image processing section 41f; an error dispersion processing section 41g; and a compression processing section 41h.

The image processing section 41 is a processing section for finally converting the input image data into image data that an operator desires, and is constructed such that the image data is processed in this processing section until the image data is stored in the memory 43 as output image data finally converted. However, the above-described respective processing sections included in the image processing section 41 serve the function as required, and there is a case where any one of those may not operate. That is to say, with the multi-level processing sections 41a and 41b, the data binarized in the error dispersion processing section 40c is again converted into the 256 gradations.

With the synthesis processing section 41c, logic operation for each pixel, that is, OR or AND or exclusive OR operation is selectively performed. The data subjected to this operation is pixel data stored in the memory 43 and bit data from a pattern generator (PG). With the density conversion processing section 41d, the relation between the output density relative and the input density is optionally set, based on a predetermined gradation conversion table, with respect to the data signal of 256 gradations.

With the variable power processing section 41e, pixel data (density value) relative to the target pixel after the power having been changed is determined, by performing interpolation processing with the input known data, depending upon the instructed variable power, and after the power of the vertical scanning has been changed, the horizontal scanning is subjected to the variable power processing. With the pixel processing section 41f, the input pixel data is subjected to various image processing, and information collection such as feature extraction or the like can be done with respect to the data row. With the error dispersion processing section 41g, similar processing is performed as with the error dispersion processing section 40c in the image data input section 40. With the compression processing section 41h, the binary data is compressed by means of coding referred to as run length. Moreover, with regard to compression of the image data, compression acts in the last processing loop, when the final output image data is completed.

The image data output section 42 includes a restoration section 42a, a multi-level processing section 42b, an error dispersion processing section 42c and a laser output section 42d. The image data output section 42 is constructed so as to restore the image data stored in a compressed condition in the memory 43, to convert it again to the original 256 gradations, to perform error dispersion of 4-valued data which is more smooth half tone expression than the binary data, and to transfer the data to the laser output section 42d.

That is to say, with the restoration section 42a, the image data compressed in the compression processing section 41h is restored. With the multi-value processing section 42b, similar processing is performed as with the multi-level processing sections 41a, 41b in the image processing section 41. With the error dispersion processing section 42c, similar processing is performed as with the error dispersion processing section 40c in the image data input section 40. With the laser output section 42d, based on the control signal from an unillustrated sequence control, digital pixel data is converted into an on/off signal of the laser, so that the semiconductor laser in the laser write unit 26 becomes on/off state, thereby an electrostatic latent image is written on the photosensitive drum.

Incidentally, the data handled in the image data input section 40 and the image data output section 42 is stored in the memory 43 basically in a form of binary data, in order to reduce the capacity of the memory 43, however, it is also possible to process the data in a form of four-valued data, considering deterioration of the image data.

Figure 3:
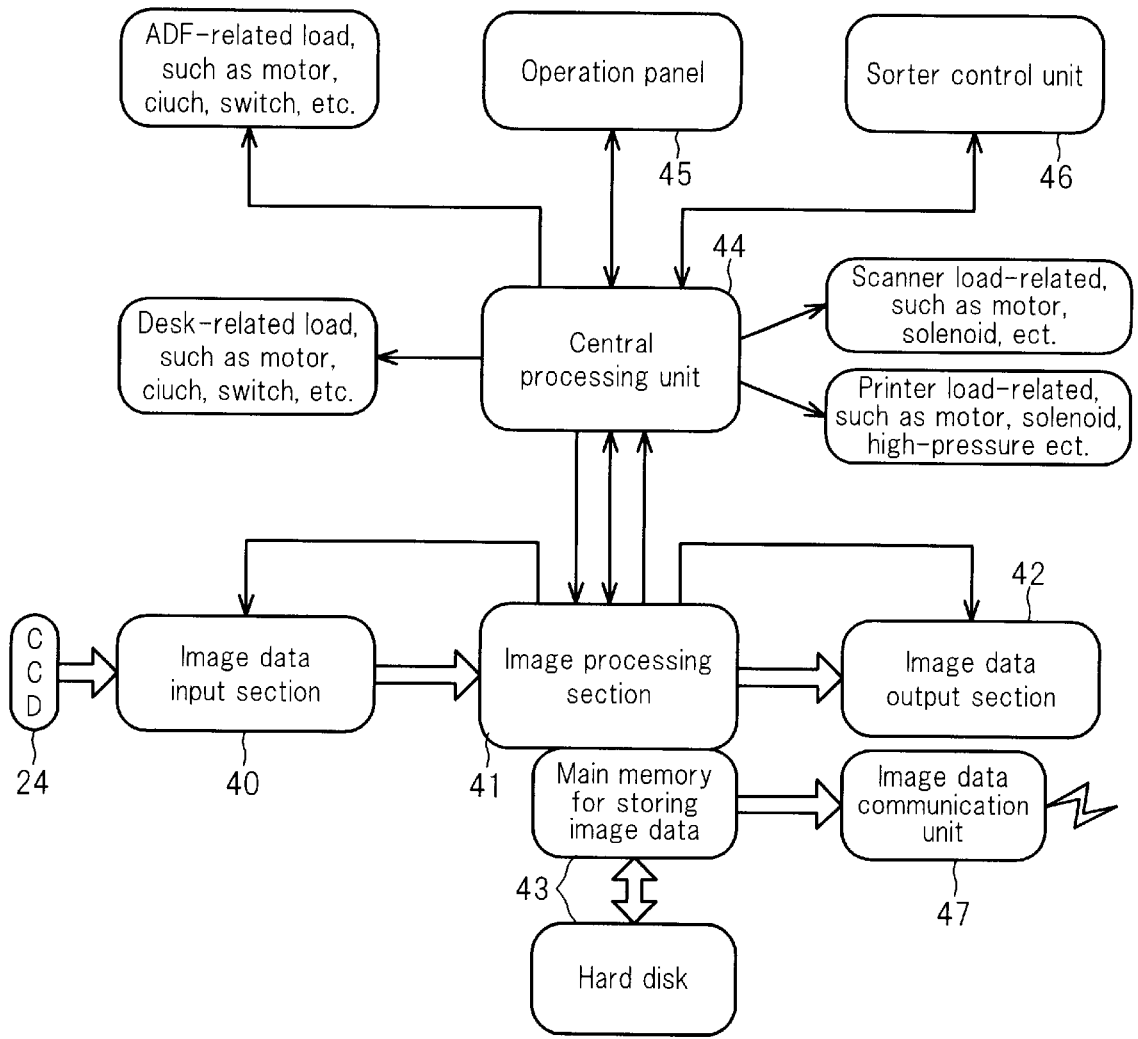
FIG. 3 is a diagram showing a condition that the operation of each section of the entire device of a digital copying machine is controlled by a central processing unit.

FIG. 3 is a diagram showing a condition that the operation of each section of the entire device of the digital copying machine 10 is controlled by the central processing unit (CPU) 44. Since the CCD 24, the image data input section 40, the image processing section 41, the image data output section 42, the image memory 43 and the central processing unit (CPU) 44 are again repeated in FIG. 2, the description thereof is omitted.

The central processing unit 44 controls respective drive mechanism sections such as a RADF 36, a scanner section 31 and a laser printer section 32 that constitute the digital copying machine 10 by means of a sequence control, and outputs a control signal to respective sections. Moreover, to the central processing unit 44 is connected an operation panel 45 in a condition of capable of mutual communication, so that the control signal is transferred to the central processing unit 44, depending upon the copying mode set and input by an operator, to thereby operate the digital copying machine 10 in accordance with the mode.

Furthermore, a control signal showing the operation condition of the digital copying machine is transferred from the central processing unit 44 to the operation panel 45. On the operation panel 45 side, the operation condition as to in what condition the device is now, is displayed to the operator by the control signal on a display section or the like.

Reference numeral 46 denotes a sorter control unit, being a control unit which controls the operation of the post-processing unit which sorts out copied paper output by the digital copying machine 10.

Reference numeral 47 is an image data communication unit provided for enabling information communication such as image information and image control signals with other digital image equipment.

Figure 4:
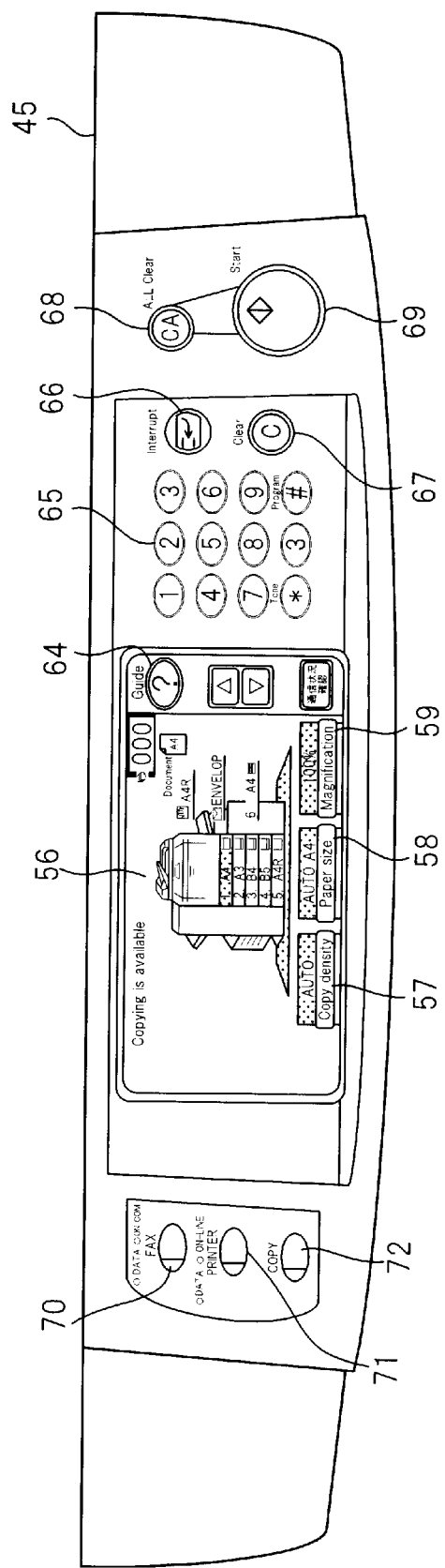
FIG. 4 is a sketch drawing showing an operation panel in a digital copying machine.

FIG. 4 shows an operation panel in the digital copying machine 10.

In the central portion of the operation panel, there is arranged a touch panel liquid crystal display device 56 serving as a display section, and various mode setting key groups are arranged in the vicinity thereof. On the screen of the touch panel liquid crystal display device 56, there is displayed a basic start screen for selecting various modes at all times. When an area regarding the instruction of the desired mode is pushed directly with a finger, as required, liquid crystal screens change sequentially so that various modes can be selected and instructed. By touching with a finger an area where a function that an operator desires is displayed, among the displayed various modes, the edit function is set.

Next is a brief description of the various setting key groups arranged on the operation panel.

FIG. 4 shows a screen of the liquid crystal display device 56 in the waiting condition, and description of this screen comes later. Reference numeral 64 denotes an operation guide key for displaying the operation method on the screen, 65 denotes ten keys for inputting numerical information such as number to be copied, 66 denotes an interrupt key for interrupting the copy mode currently being processed, by putting a new copy mode therein, 67 denotes a clear key for clearing the conditions having input by ten keys or the like, 68 denotes an all clear key for clearing all the conditions of the digital copying machine and returning to the standard condition, and 69 denotes a start key for instructing start of the processing in the mode set by these keys. A group of three keys arranged on the left side of the operation panel 45 is a mode change-over means comprising a Fax mode 70, a printer mode 71 and a copy mode 72 in the order from the top.

The operation panel presented here and various keys arranged on the operation panel are only an example, and needless to say, keys provided on the operation panel are different depending upon various functions installed in the digital copying machine.

Figure 5:
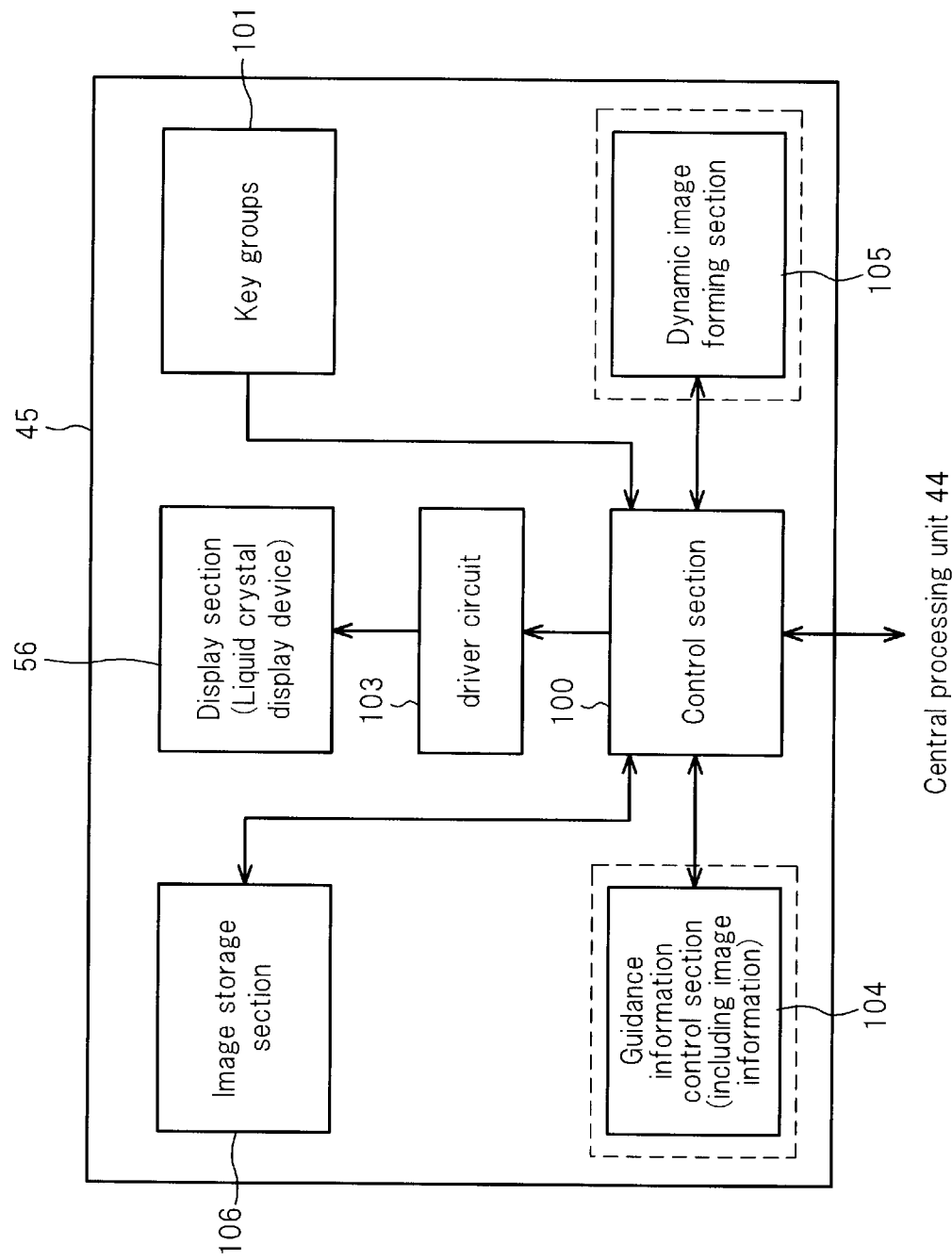
FIG. 5 is a block diagram showing the details of an operation panel of a digital copying machine.

FIG. 5 is a block diagram showing the details of the operation panel 45 of the digital copying machine shown in FIG. 3.

The operation panel 45 is controlled by a control section 100, and comprises: a plurality of key groups 101 provided on the operation panel for instructing a processing mode desired by a user to the device; a display section 56 for displaying for guidance the condition of the apparatus, the set condition of modes or the like for a user; a driver circuit 103 for driving the display section 56; a guidance information control section 104 for controlling a plurality of guide display information displayed on the display section 56; a dynamic image forming section 105 for forming a dynamic image information from the image information controlled in the guidance information control section 104; and an image storage section 106.

The control section 100 performs mutual communication with the central processing unit 44 which controls the entire device of the digital copying machine 10. That is to say, the processing mode instructed by a user is transmitted from the control section 100 to the central processing unit 44, and the information regarding the condition of apparatus is transmitted from the central processing unit 44 to the control section 100, so that appropriate operation is performed, while situations of respective sections are monitored at all times as the entire apparatus.

In the guidance information control section 104, a plurality of guidance information is stored and controlled as the information to be displayed on the display section 56. Here, the guidance information refers to messages and images for explaining the condition of apparatus and operation procedures, for guiding the user (operator). The control section 100 reads necessary guidance image information depending upon the condition of apparatus, and displays the guidance image information on the display section 56, by using the dynamic image forming section 105 and the driver circuit 103. At this time, it is constructed such that the guidance image information depending upon the condition of apparatus stored and controlled in the guidance information control section 104 is stored and controlled in a set of at least two guidance image information (static images), and dynamic image information is formed by the dynamic image forming section 105, using the at least two guidance image information, and displayed for guidance on the display section 56.

Here, the operation panel 45 is provided with a mode for selectively setting the display form, whether new image information is formed by the dynamic image forming section 105, and a plurality of static image information is sequentially displayed on the display section 56, together with the static image information controlled in the guidance information control section 104, to thereby guide the user and display these as continuous guidance image information, or the static image information controlled in the guidance information control section 104 is displayed to thereby guide the user and display this as the guidance image information.

As a method of setting the mode, in the operation panel 45 in FIG. 5, operation of a plurality of specific keys of the key groups 101 in a predetermined order brings a display mode setting condition, and in this condition, whether a new image is formed or not by using the dynamic image forming section 105 can be set. The condition regarding the mode setting is controlled by the control section 100. Then, the dynamic image forming section 105 is operated depending upon the set mode, and it can be easily set whether or not a new image is formed and displayed the image as continuous guidance image information, depending upon the environment of the place where the apparatus is installed, user's demands or the like.

Moreover, it is also possible to make the dynamic image forming section 105 an extended unit using a memory medium, and to optionally add it for extension, depending upon the environment of the place where the apparatus is installed, user's demands or the like. Whether or not the extended unit of the dynamic image forming section 105 is added for extension is monitored by the control section 100 via a circuit, and it is constructed such that when it is confirmed that the extended unit is attached, new image information is formed by using the static image information controlled in the guidance information control section 104, and displayed for guidance on the display section 56 as continuous image information.

Here, when the information is displayed for guidance as the continuous image information, it is described such that the static image information controlled in the guidance information control section 104 and new image information formed by the dynamic image forming section 105 are sequentially displayed to thereby be displayed for guidance as continuous image information, however, it is also possible to sequentially display new image information formed by the dynamic image forming section 105 based on the static image information controlled in the guidance information control section 104 to thereby be displayed for guidance as continuous image information.

Moreover, various peripheral equipment are prepared for the image forming apparatus, and by combining the various peripheral equipment and the image forming apparatus to constitute a system, an image forming system which meets the needs of users can be provided.

The peripheral equipment include an automatic document feeder, a large capacity paper feeder unit and a post-processing device or the like. These peripheral equipment are known in the art, hence detailed description thereof is omitted.

A guidance information control section wherein information regarding respective devices is controlled is installed in the various peripheral equipment, and connected to the image forming apparatus to thereby operate under the supervision of the main control section (CPU 44) of the image forming apparatus.

The information regarding respective devices controlled in the information control section includes at least two guidance image information (static images) required in the relationship between the image forming apparatus and the peripheral equipment. From the at least two static image information, a new image stated therebetween is formed and displayed for guidance on the display section of the image forming apparatus as continuous image information.

Figure 6:
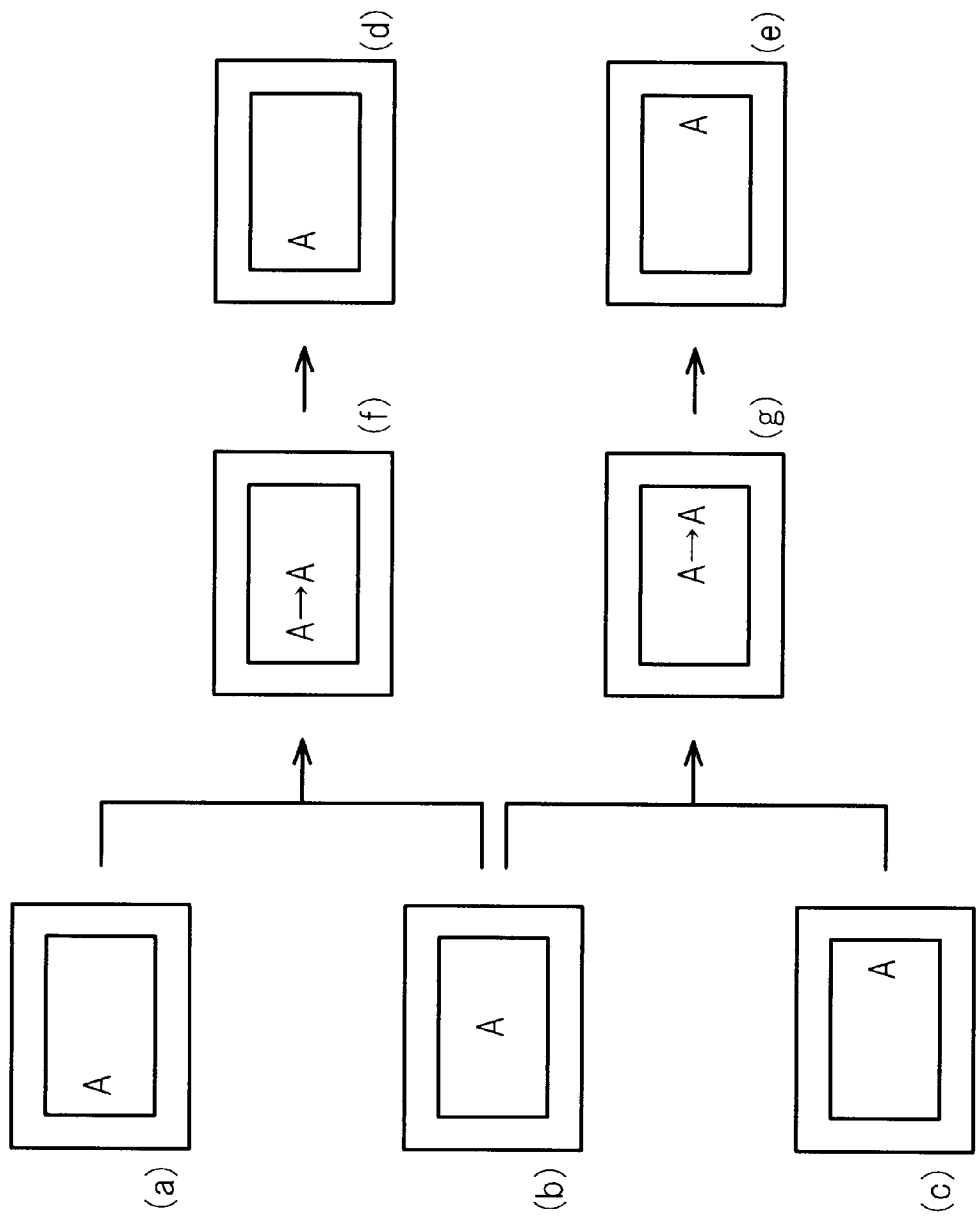
FIG. 6 is a schematic diagram illustrating the formation of an interpolated guidance image information from a guidance image information in a static image, in a dynamic image forming section.

Next is a brief description of a method for forming guidance image information in a dynamic image from guidance image information in a static image in the dynamic image forming section 105, with reference to FIG. 6.

FIGS. 6 (a), (b) and (c) are guidance image information in a static image stored and controlled in the guidance information control section 104. From the guidance image information, a static image located between the guidance image information (a) and the guidance image information (b), and a static image located between the guidance image information (b) and the guidance image information (c) are formed as guidance image information (d) and guidance image information (e) from respective image features. Then, the control section 100 controls via the driver circuit 103 so that these information is displayed for guidance on the display section 56 in the order of from the guidance image information (a), (d), (b), (e) and (c).

As the forming method, the guidance image information (a) and the guidance image information (b), and the guidance image information (b) and the guidance image information (c) are respectively compared, to extract features of a portion which changes in the images as image information (f) and (g), and guidance image information (d) and (e) which interpolate between the guidance image information (a) and the guidance image information (b), and the guidance image information (b) and the guidance image information (c) are formed. The guidance image information (d) and (e) which interpolate among the guidance image information (a), (b) and (c) formed by the dynamic image forming section 105 is stored and controlled for a while in the image storage section 106, read out as required, and displayed for guidance on the display section 56 in a predetermined order, together with the guidance image information (a), (b) and (c) stored and controlled in the guidance information control section 104.

It is also possible to store and control the guidance image information (a), (b) and (c) as well as the guidance image information (d) and (e) together in the image storage section 106 and display these for guidance sequentially as the guidance image information depending upon the condition of the device.

Here, interpolated static images which interpolate between respective images are formed from three static images, to thereby sequentially display for guidance static images of five frames as guidance image information in a dynamic image. However, it is also possible to sequentially display for guidance static images of nine frames, by forming interpolated static images which interpolate between respective images from five static images continuously. Moreover, it is also possible to form an interpolated image even from at least two static images.

To which level interpolated guidance image information is formed depends upon the memory control capability (memory capacity) of the image storage section 106 or the processing capability of the dynamic image forming section 105, and the display expressiveness when the guidance image information is actually displayed on the display section 56, and is optionally selected in view of cost, display processing capability or the like.

Moreover, the static image stored and controlled in the guidance information control section 104 may be formed beforehand with static images, considering to make it easy to extract the feature (the portion to be changed) of the image, so that a static image interpolating respective images can be easily formed by the dynamic image forming section 105. Because it becomes possible to form a new static image interpolating respective static images efficiently in a short period of time.

For example, as shown in FIG. 7, when a part of the device is enlarged and displayed, images in which only a portion to be displaced is changed, while a portion which does not change on the display image information to be displayed on the display section 56 is fixed are stored and controlled as one set (display image information (a), (b) and (c) in FIG. 7). Then, the changed portion is easily computed and image information interpolating between the respective images (interpolated image information (d) and (e) in FIG. 7) is easily formed by the dynamic image forming section 105.

Moreover, as another method, as shown in FIG. 8, background image information (a) stored and controlled in the guidance information control section 104 and image information ((b), (c) and (d)) serving as originals of the dynamic image information are stored and controlled in the guidance information control section 104. Here, of the display image information, a partial image of where there is no change on the display position is designated as a background image information, and a partial image of where there is a change on the display position is designated as the image information.

As described above, from the display image information ((b), (c) and (d)) serving originals of the dynamic image information, interpolated image information ((e) and (f)) serving as new image information is formed, and overlapped on the background image information and displayed as a series of image information together therewith, hence image information by means of a dynamic image is provided to users.

Here, it is constructed such that from image information serving as originals for the dynamic image information, stored and controlled in the guidance information control section 104, image information interpolating the image information is newly formed and sequentially displayed, to thereby form dynamic image information. However, it is also possible to display as guidance image information having a motion on the display section 56, based on a partial image where the display position changes from the image information serving as the original of the dynamic image information, and the data (vector data) regarding movement (displacement) of the partial image information such as the direction of movement of the display position, the distance of movement of the display position or the like.

As described above, the image information displayed in the information display section as the information regarding the condition of apparatus is displayed for guidance to the user as dynamic image information, and it becomes possible to provide precise information so that a user is not confused even in the case of multi-function electronic equipment. Moreover, since from at least two static image information, (more static information) is formed as dynamic image information, the memory capacity of the storage section for storing and controlling the display image information of the apparatus body can be reduced, enabling reduction in cost.

With the above-described construction, as described above, a guidance information control section in which information of respective devices is controlled is installed in various peripheral equipment, and connected with the image forming apparatus, hence various peripheral equipment operate in association with the image forming apparatus, and the image information displayed on the display section of the image forming apparatus is displayed for guidance as the image information regarding the image forming apparatus and the peripheral equipment.

For example, if explanation is made for a case where a post-processing device is combined with the image forming apparatus to form an image forming system, the guidance information regarding the post-processing device is controlled in the information control section of the post-processing device, and when it is connected to the image forming apparatus, at least two display image information controlled as the post-processing device in the apparatus body is transferred to the image forming apparatus side.

FIG. 9 shows new display image information (c) formed from at least two display image information (a) and (b) including the image forming apparatus and a peripheral equipment, controlled in the information control section 111 of the post-processing device 110, and by sequentially displaying the at least three display image information on the display section 56, the information is displayed for guidance as continuous image information.

Incidentally, it has been described such that the display image information is automatically transferred from the peripheral equipment when the peripheral equipment is connected to the image forming apparatus, and controlled beforehand in the image forming apparatus side, but it is also possible to transfer the display image information to the image forming apparatus side, as required, when the guidance information is displayed on the display section 56.

Moreover, it is also possible to construct the guidance information control section 104 as an extended unit comprising a memory medium, so as to be replaced with a new guidance information control section 104 corresponding to a peripheral equipment, upon connection of the peripheral equipment with the image forming apparatus.

It is necessary to display as guidance the display image information (a), (b) and (c) including the image forming apparatus and the peripheral equipment, without displaying on the display section the guidance display image information in the paper ejection section of the image forming apparatus provided beforehand in the image forming apparatus. At this time, it is constructed such that the display image information (a) and (b) including the image forming apparatus and the peripheral equipment are additionally stored and controlled, without deleting the display image information, in the paper ejection section of the image forming apparatus, which is stored and controlled in the guidance information control section 104 beforehand.

Figure 10A:
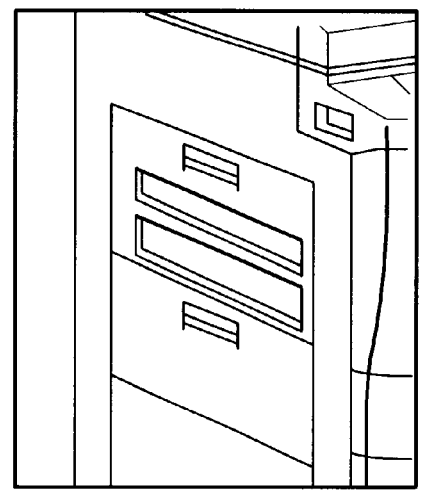
FIGS. 10A to 10C are schematic diagrams showing a display image information in a paper ejection section, stored and controlled in a guidance information control section of an image forming apparatus.
Figure 10B:
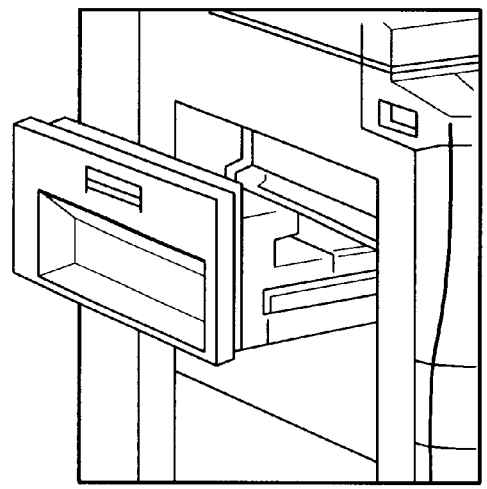
Figure 10C:
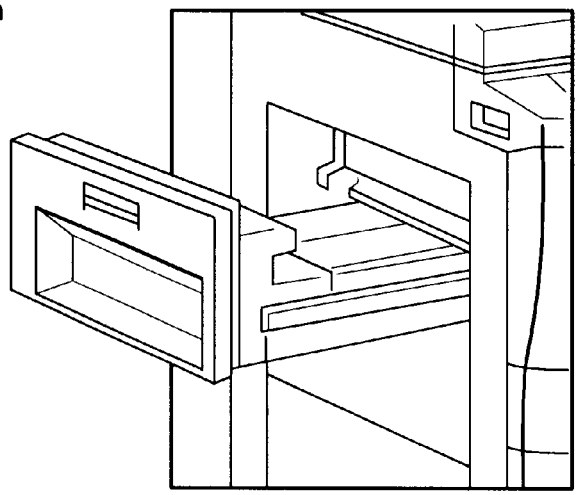

This is because it is considered that the image forming apparatus alone can reset the operation (reset the display), when the post-processing device serving as the peripheral equipment is removed from the image forming apparatus at a later stage. FIGS. 10A to 10C show the display image information in the paper ejection section of the image forming apparatus, which is stored and controlled beforehand in the guidance information control section 104 of the image forming apparatus. In the condition having no post-processing device, guidance image information is displayed continuously based on the display image information.

With the above-described construction, even if the peripheral equipment is connected to the image forming apparatus, it becomes possible to perform display guidance by means of images including a peripheral equipment without imposing a burden on the apparatus, and the apparatus can be provided to users as an apparatus easy to understand.

Next is a description of the display method of the display screen information in the present invention by way of examples.

First, description is made for a case where a static image controlled in the guidance information control section 104 is displayed for guidance as guidance image information. The display images on the display section 56 shown below are stored in the guidance information control section 104, and displayed on the display section 56 by the control section 100 through the driver circuit 103.

Figure 11:
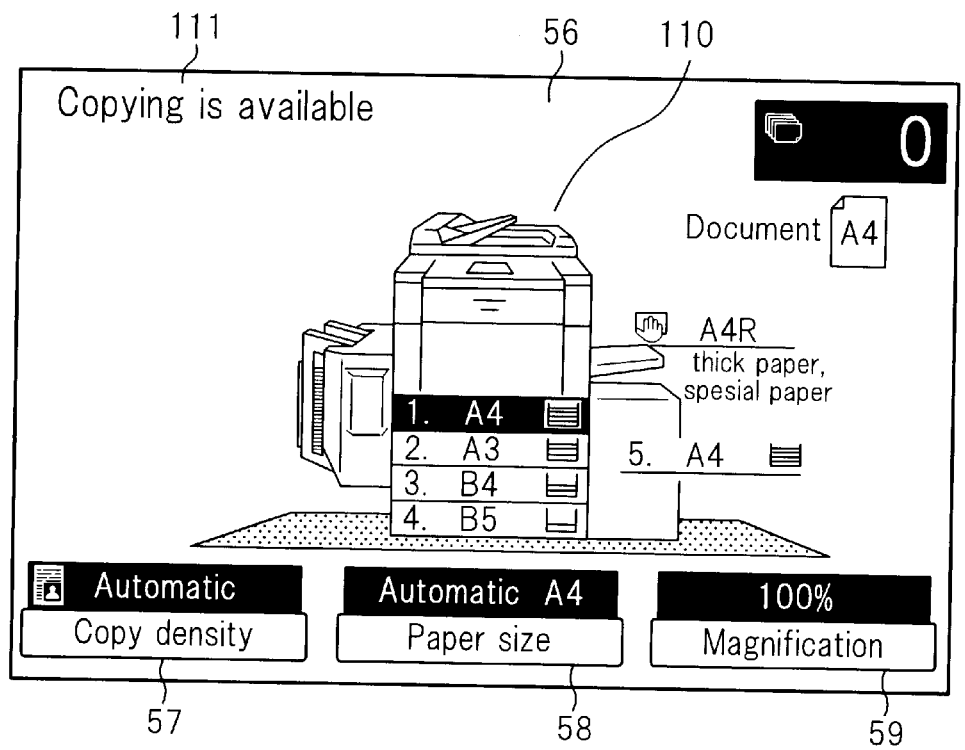
FIG. 11 is a schematic diagram showing a display section in a waiting condition in a normal copy start-enabled condition.

FIG. 11 is a schematic diagram showing a display section 56 in a waiting condition with nothing happening, in a normal copy start-enabled condition. From the condition in FIG. 11, when start of recording operation is instructed, recording of an image on a recording material is started. In the central part of the display section 56, there are displayed a sketch drawing 110 showing the digital copying machine 10 and a message 111 showing it is in a copy enabled condition. Then, below the sketch drawing 110, there are provided a copy density setting key 57 for setting the copy density, a paper size setting key 58 for setting the paper size, and a magnification setting key 59 for setting the copying magnification.

Figure 12:
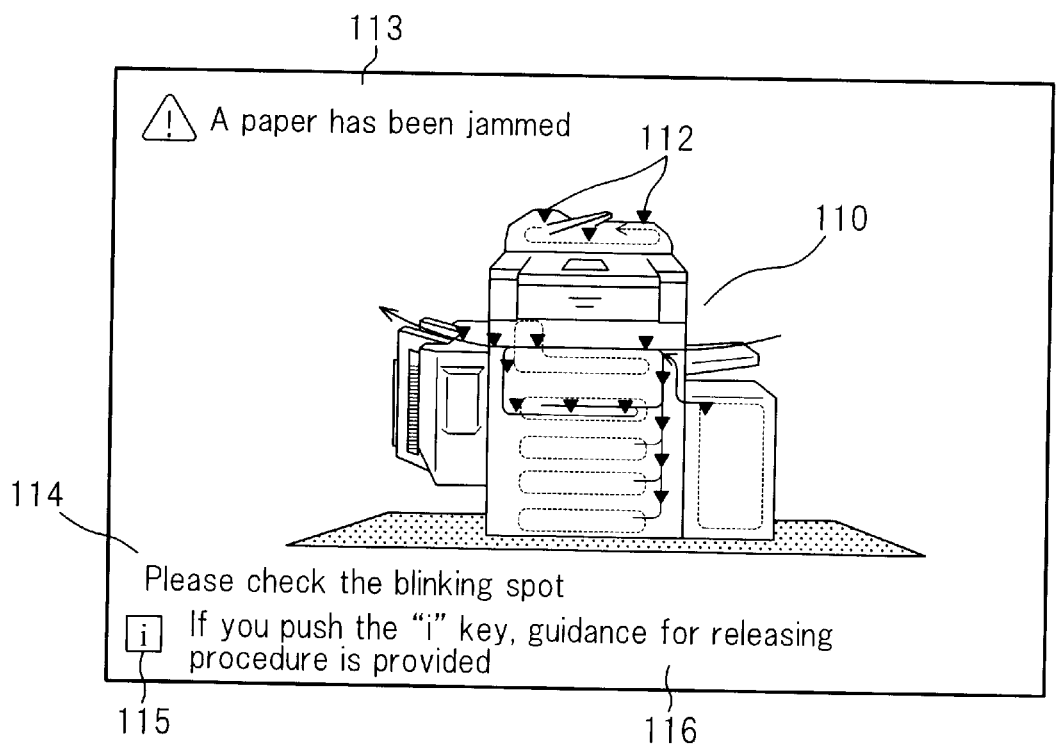
FIG. 12 is a schematic diagram showing a display section when a paper jam occurs.

Then, when an image is being recorded, the progress state of processing in the apparatus is displayed for guidance, and when the apparatus is in a specific condition such as paper jam or the like, occurrence of a paper jam is displayed in a message on the display section where the sketch drawing of the apparatus is displayed, as well as the place where the paper jam occurred is displayed, to thereby advise to check the place where the paper jam occurred. For example, when a paper jam occurs, a black triangular mark 112 is displayed blinking in a portion where the existence of a recording material is confirmed in the carrier route in FIG. 12, and a paper jam message 113 and an instruction message 114 are displayed.

At this time, if a user is a person who often utilizes the apparatus and understands the apparatus to some extent, he/she can confirm the place where the paper jam occurred by the black triangular mark 112, operate the apparatus to thereby skillfully remove the recording material in the carrier route of recording material in the apparatus, and return the apparatus to the recording enabled condition.

On the contrary, a person who does not understand the apparatus well operates an information key "i" 115 arranged in the vicinity of the sketch drawing 110 of the digital copying machine, according to an instruction message 116 of remove control procedure, then, the procedure method for removing the recording material stagnating in the carrier route as a paper jam is advised by means of image information.

Figure 13:
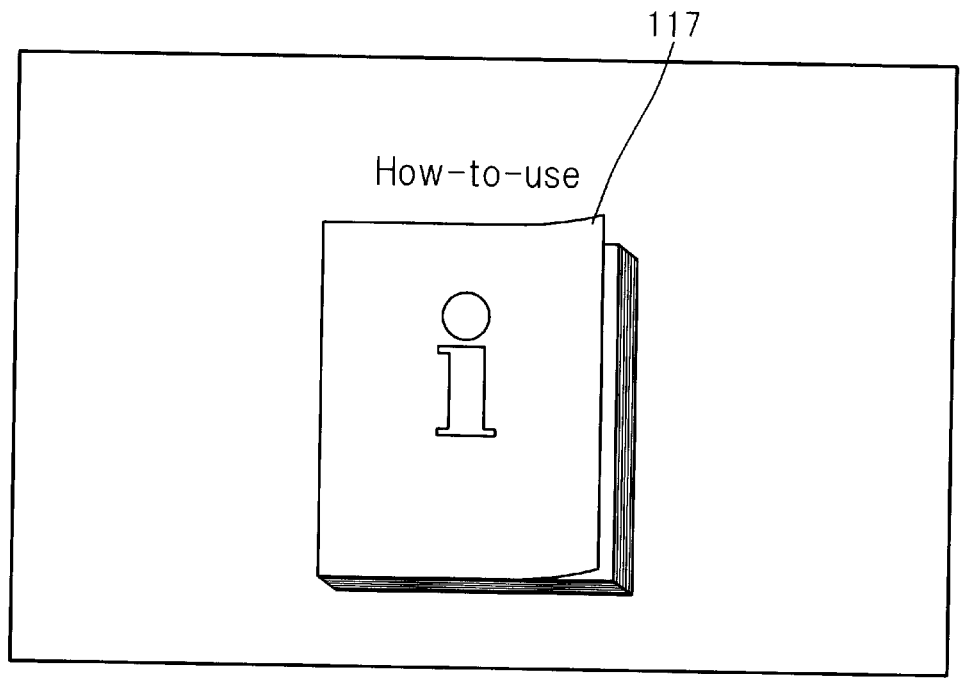
FIG. 13 is a schematic diagram where an image of a how-to-use guide book of is displayed.

FIG. 13 and after are display images for informing a user that the guidance information is now to be displayed, when the information key "i" 115 is pushed.

First, as shown in FIG. 13, an image 117 of a how-to-use guide book is displayed.

Figure 14:
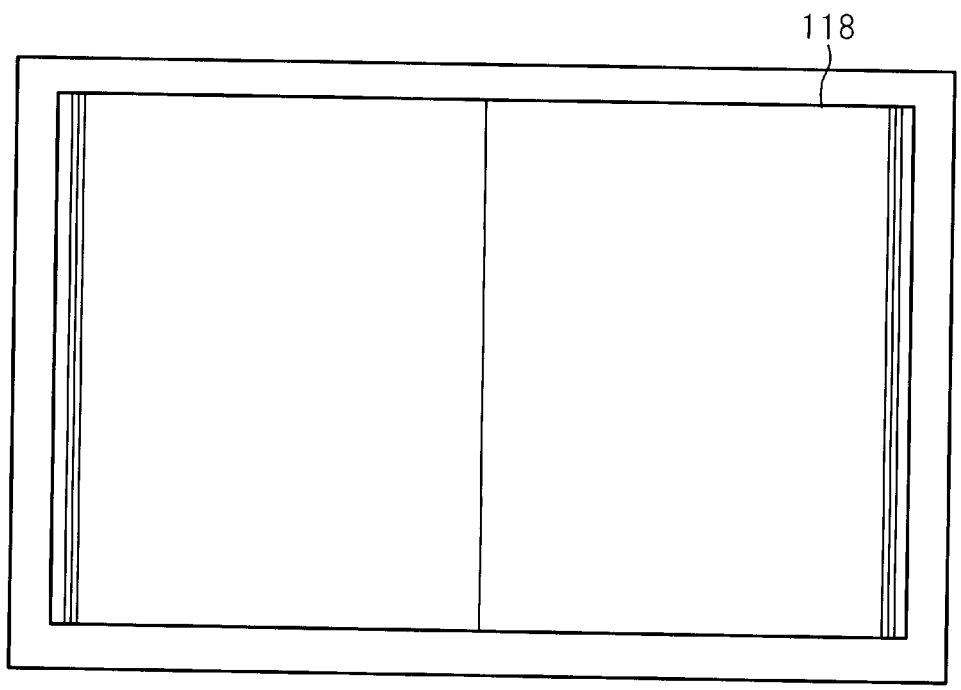
FIG. 14 is a schematic diagram where a picture of a how-to-use guide book is displayed in an opened condition.
Figure 15:
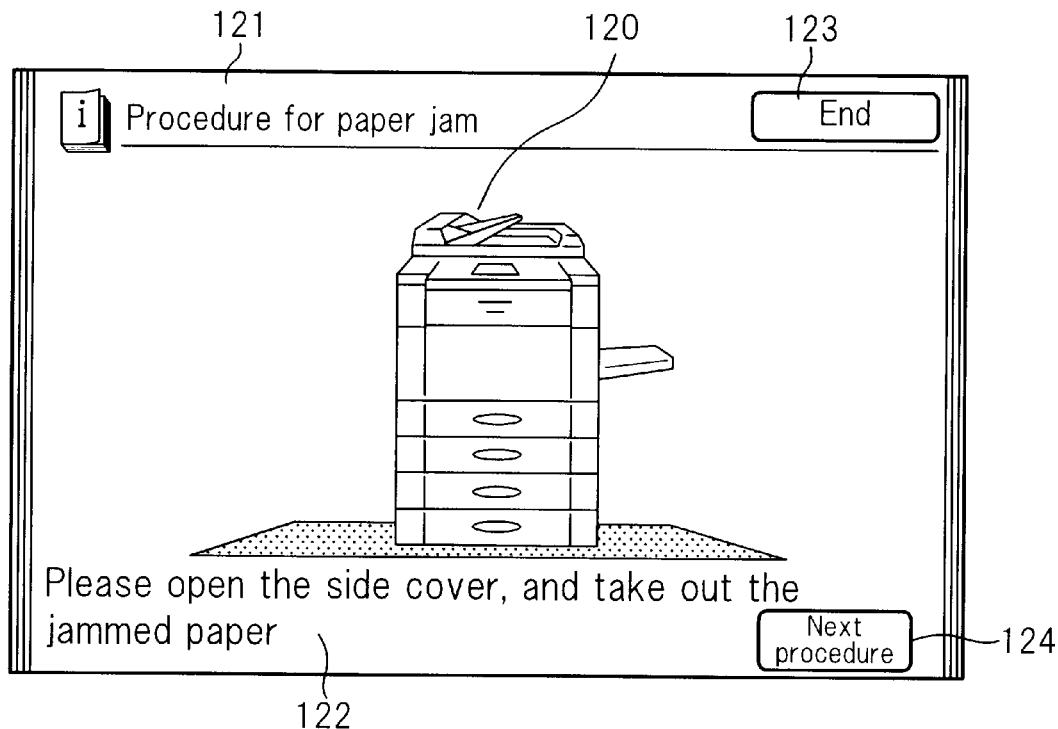
FIG. 15 is a schematic diagram displaying a message for removing a jammed recording material by releasing a side cover of the apparatus body.

Then, as shown in FIG. 14, there is shown a picture 118 in the state that the how-to-use guide book in that image is opened. As shown in FIG. 15, the user is guided by a message 122 to release the side cover of the apparatus body and remove the stagnating recording material. At this time, there are displayed a message 121 for the paper jam processing on the upper left of the display section 56, a sketch drawing 120 of the digital copying machine body in the center, the end key 123 on the upper right, and a "next procedure" key 124 on the lower right.

Here, if the user can understand the cover on the side of the apparatus body, he/she then can open the side cover and remove the stagnating recording material, but if the user cannot understand it, he/she then presses (touches) the "next procedure" key 124 displayed on the display area on the lower right on the display screen. Incidentally, a transparent touch panel is provided on the display screen of the liquid crystal display device 56, and by selectively operating the image information displayed on the display device, instruction can be selected with respect to the apparatus.

When the "next procedure" key 124 displayed on the display area on the lower right on the display screen is pushed (touched), the display image is changed and guided so that the recording material can be reliably removed along the flow of the recording material in the carrier route, in the order of paper feed section, image forming section and paper ejection section among the carrier route of the recording material.

In addition, in this description, it is described that the status information regarding the change in the apparatus condition is overlapped and displayed on a part of the sketch drawing 120 of the apparatus body, corresponding to the portion where the change in the apparatus condition occurred. However, it is also possible to display the information regarding the change in the apparatus condition in the vicinity of the sketch drawing 120 of the apparatus corresponding to the portion where the change in the apparatus condition occurred.

(Removal Method of a Recording Material in the Paper Ejection Section)

Figure 16:
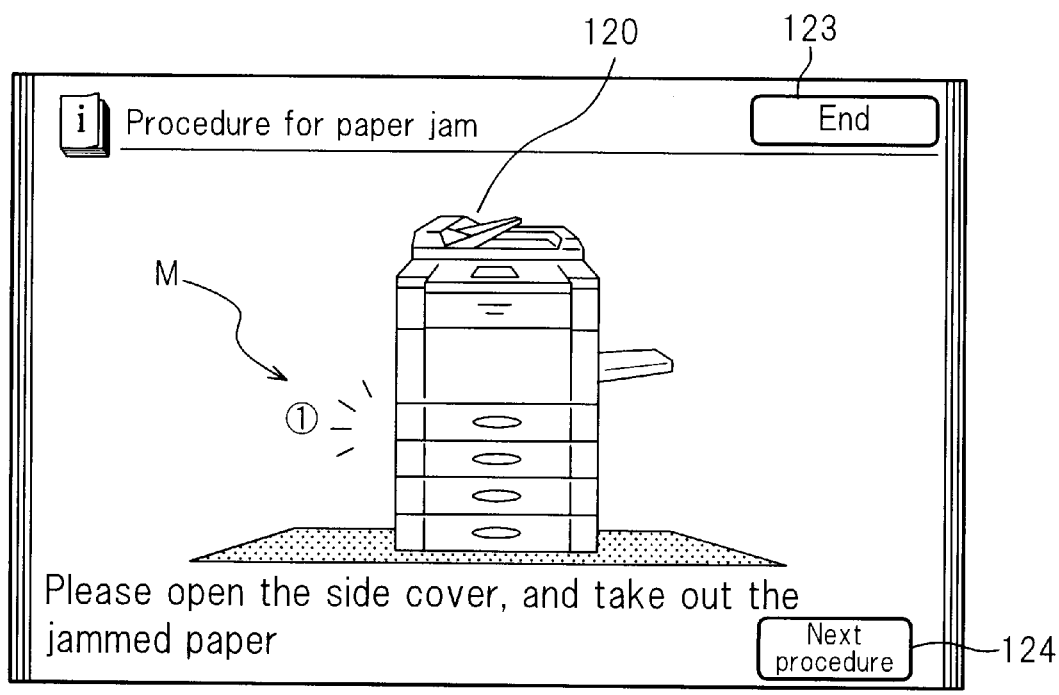
FIG. 16 is a schematic diagram showing with a mark a portion where a left side cover exists in the sketch drawing of the apparatus body.
Figure 17:
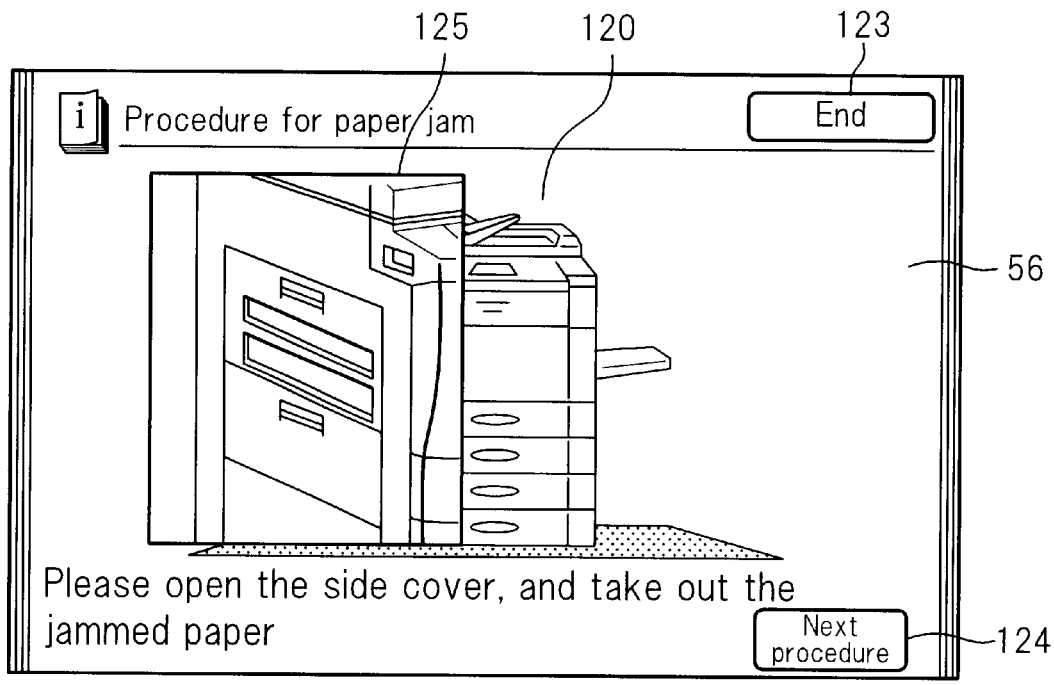
FIG. 17 is a schematic diagram displaying an enlarged image of the left side cover by partially overlapping it on a portion where the left side cover is located.

As shown in FIG. 16, a portion where the left side cover is located in the sketch drawing 120 of the apparatus body is made clear by a mark M1̂ (the mark M1̂ is blinked several times), and as shown in FIG. 17, an enlarged image 125 of the left side cover is partially overlapped and displayed on a portion where the left side cover is located in the sketch drawing 120 of the apparatus body displayed on the screen of the display device 56 (a portion where the mark M1̂ was blinking on the former screen). At this time, there is a difference on the display form between the sketch drawing 120 of the apparatus and the enlarged image 125, and consideration is given so that the enlarged image 125 is more remarkable than the sketch drawing 120 of the apparatus. For example, it is displayed such that the display density (tone) is made to be thicker in the enlarged image 125 than in the sketch drawing 120 of the apparatus.

Figure 18:
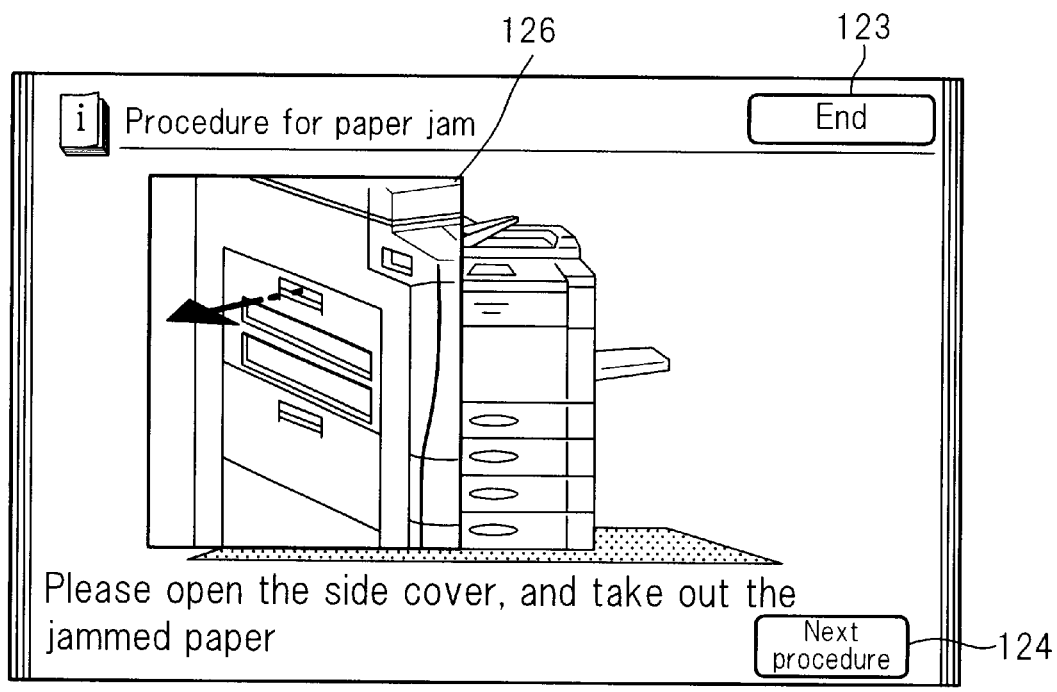
FIG. 18 is a schematic diagram showing the manner that the side cover is opened, by changing the enlarged diagram sequentially.
Figure 19:
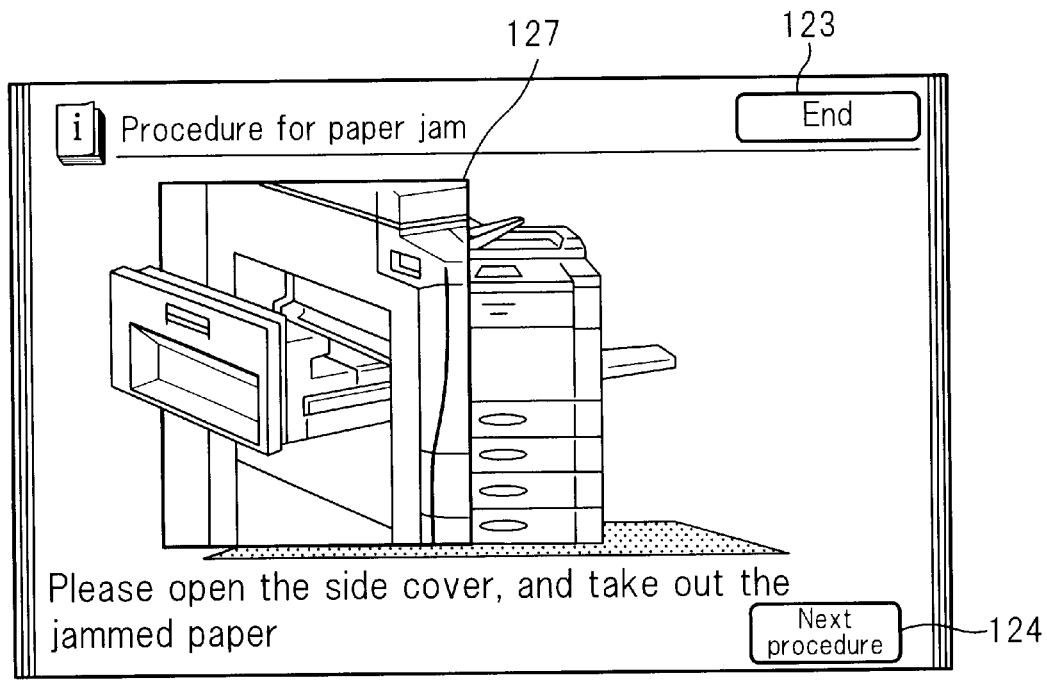
FIG. 19 is a schematic diagram showing the manner that the side cover is opened, by changing the enlarged diagram sequentially.
Figure 20:
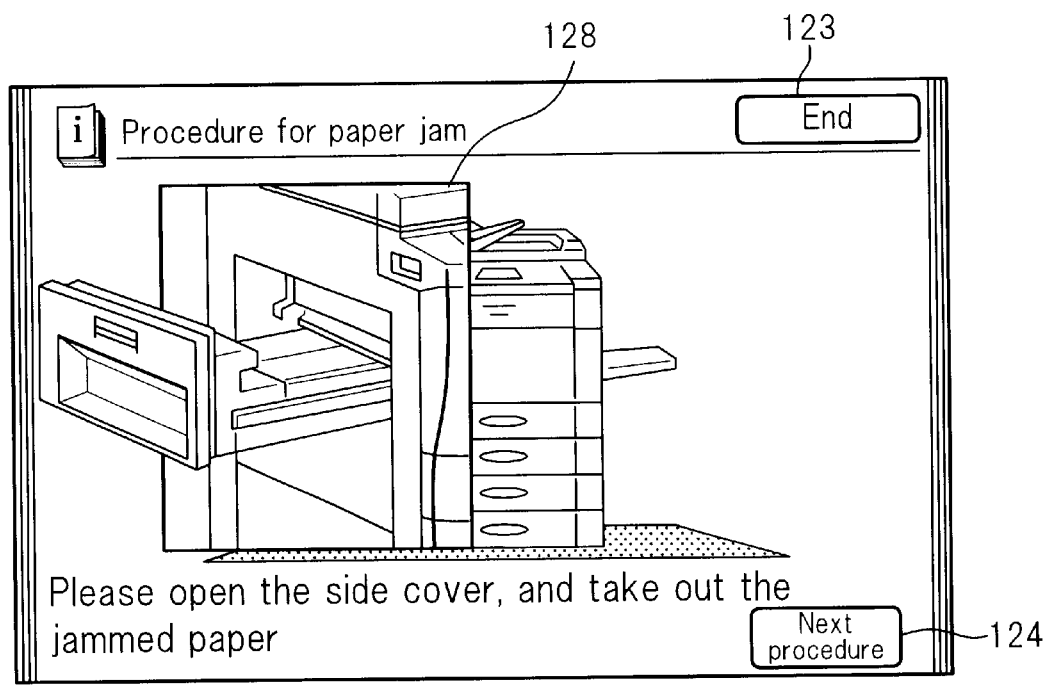
FIG. 20 is a schematic diagram showing the manner that the side cover is opened, by changing the enlarged diagram sequentially.

Thereafter, the processing procedure for paper jam by releasing the side cover of the apparatus body is informed by means of a plurality of display information along the flow. When the "next procedure" key 124 displayed on the display area on the lower right on the display screen is pushed (touched), the display image is changed from FIG. 18 through to FIG. 19 and FIG. 20. Then, the enlarged diagram is changed sequentially from 125 to 128, showing the manner that the side cover is opened.

(Removal Method of a Recording Material in the Image Forming Section)

Figure 21:
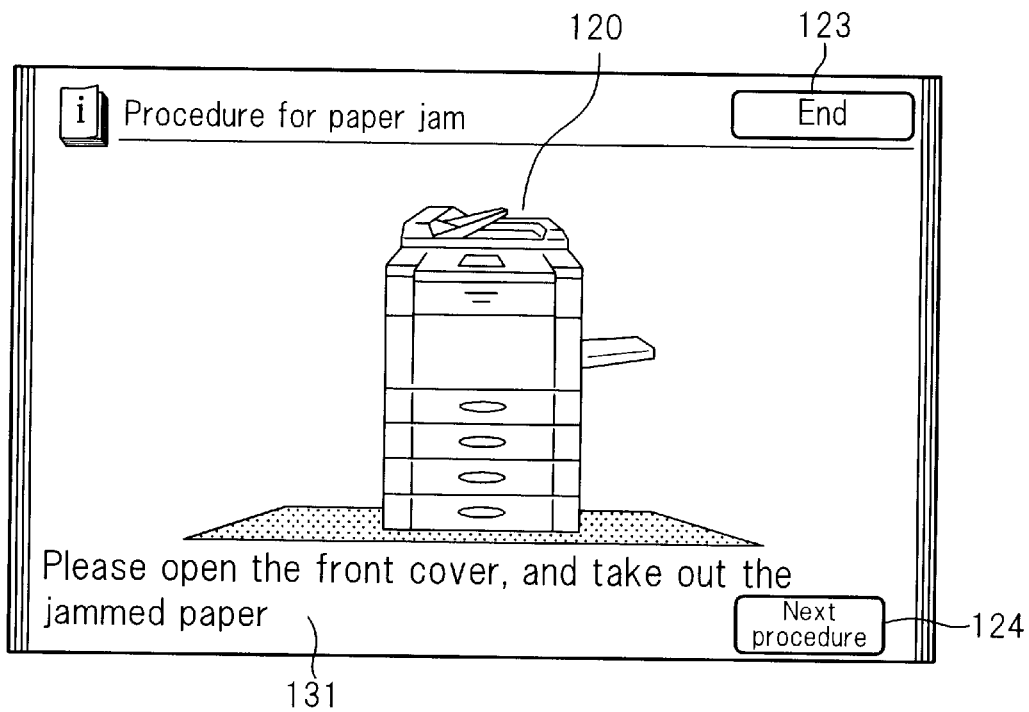
FIG. 21 is a schematic diagram displaying a message so as to open a front cover of the apparatus body and remove a recording material jammed in an image recording section.
Figure 22:
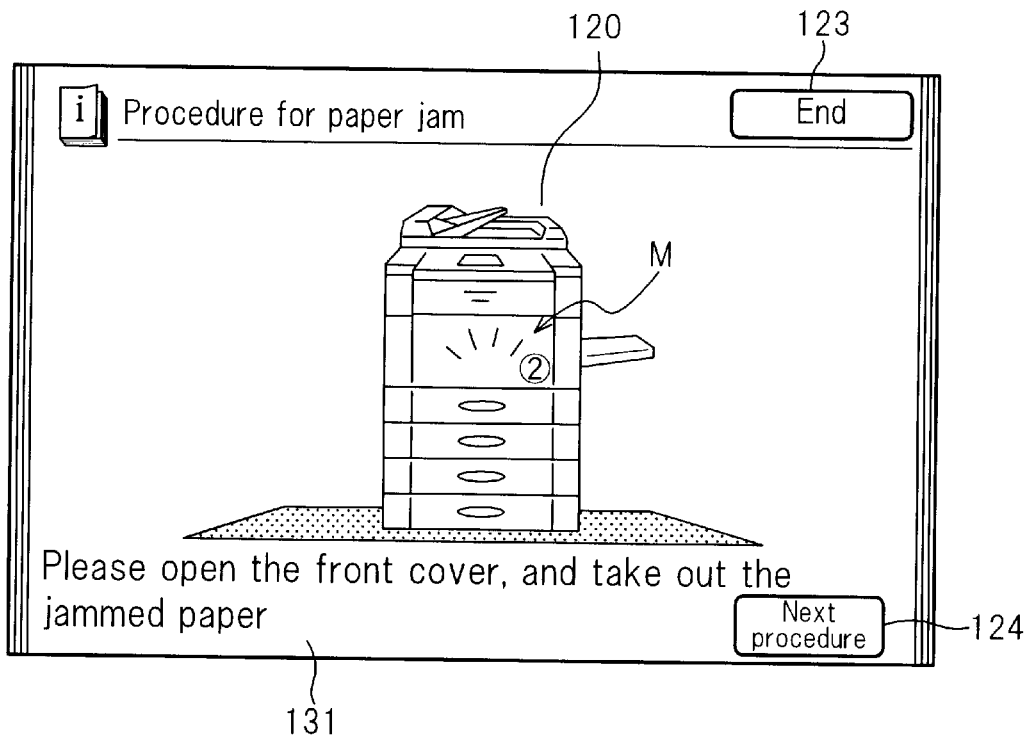
FIG. 22 is a schematic diagram showing with a mark a portion where the front cover exists in the sketch drawing of the apparatus body.
Figure 23:
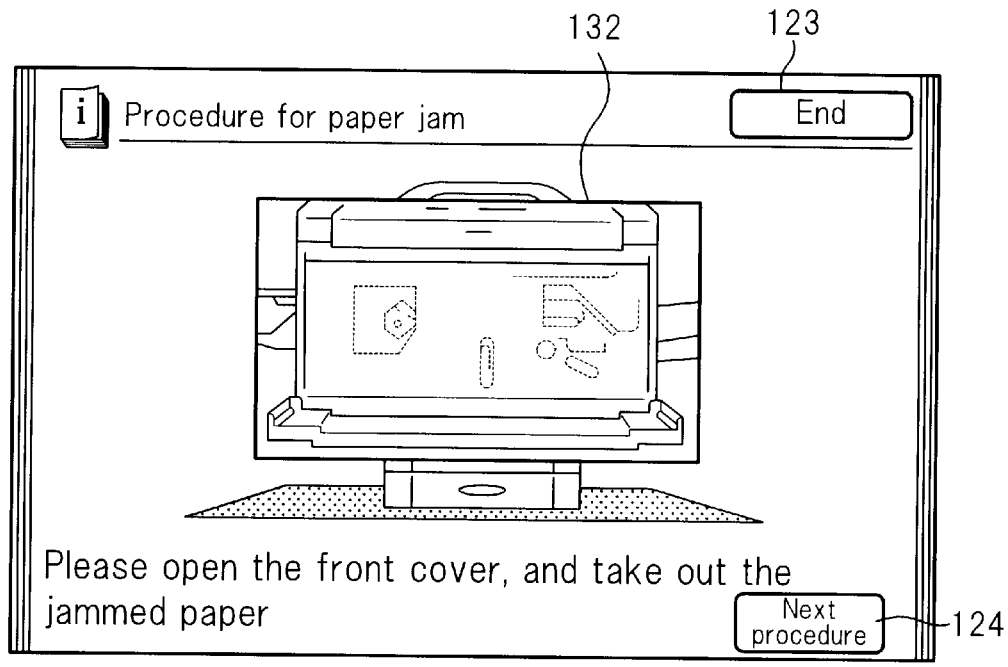
FIG. 23 is a schematic diagram displaying an enlarged image of the front cover by partially overlapping it on a portion where the front cover is located in the sketch drawing of the apparatus body.
Figure 24:
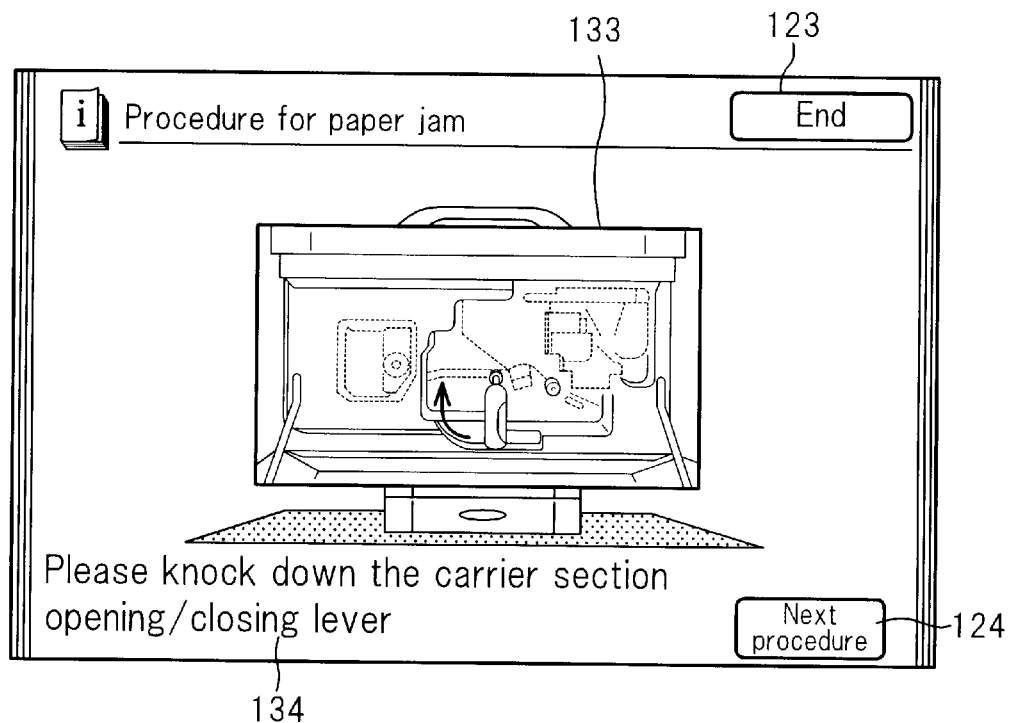
FIG. 24 is a schematic diagram displaying an enlarged image of the front cover by partially overlapping it on a portion where the front cover is located in the sketch drawing of the apparatus body.

As shown in FIG. 21, guidance is given by a message 131 so as to remove a recording material stagnating in the image recording section by opening the front cover of the body. Here, as in the paper ejection section, when the "next procedure" key 124 displayed on the display area on the lower right on the display screen is pushed (touched), as shown in FIG. 22, a portion where the front cover is located in the sketch drawing 120 of the apparatus body is made clear by a mark M2̂ (the mark M2̂ is blinked several times). Then, as shown in FIGS. 23 and 24, enlarged images 132 and 133 of the front cover are partially overlapped and displayed on a portion where the front cover is located in the sketch drawing 120 of the apparatus body displayed on the screen of the display device (a portion where the mark M2̂ was blinking on the former screen). At this time, there is a difference on the display form between the sketch drawing 120 of the apparatus and the enlarged images 132 and 133, and consideration is given so that the enlarged images 132 and 133 are more remarkable than the sketch drawing 120 of the apparatus.

For example, it is displayed such that the display density (tone) is made to be thicker in the enlarged images 132, 133 than in the sketch drawing 120 of the apparatus.

Thereby, a user can understand to open the cover in the front of the apparatus and remove the recording material existing in the carrier route in the vicinity of the image forming section. When removal of the stagnating recording material is finished by this display information, the front cover of the apparatus body is closed, to thereby complete removal of the recording material in the image forming section.

(Removal Method of a Recording Material in the Paper Feed Section)

Figure 25:
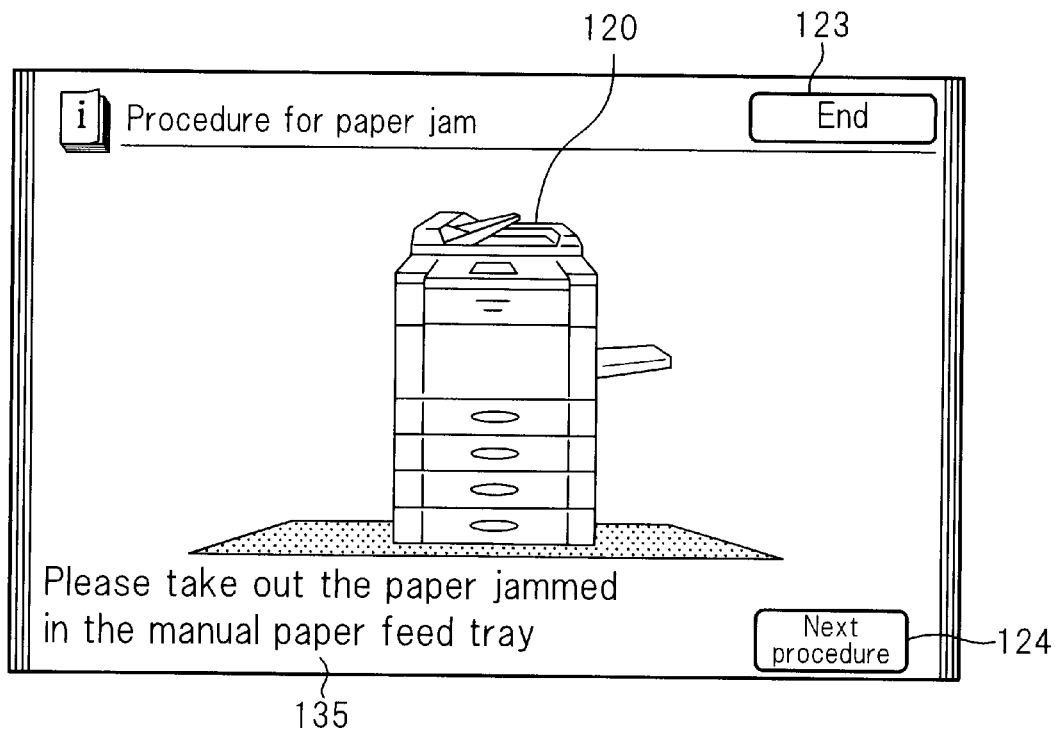
FIG. 25 is a schematic diagram displaying a message for removing a recording material jammed in a manual paper feed section of the apparatus body.
Figure 26:
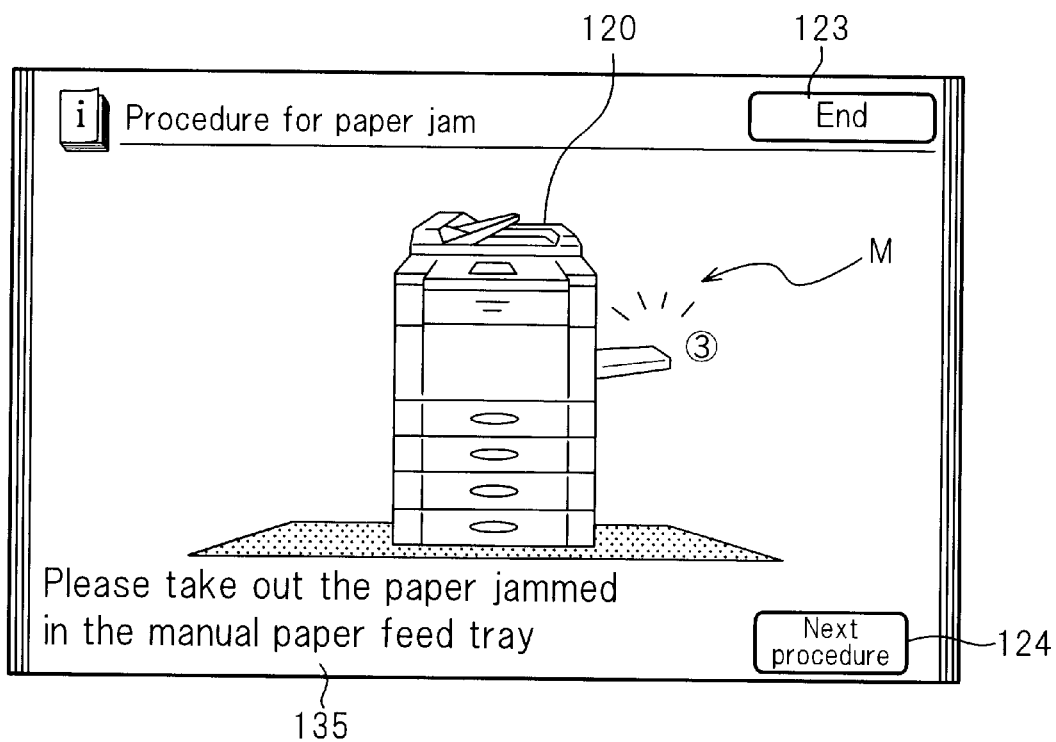
FIG. 26 is a schematic diagram showing with a mark a portion where the manual paper feed section exists in the sketch drawing of the apparatus body.
Figure 27:
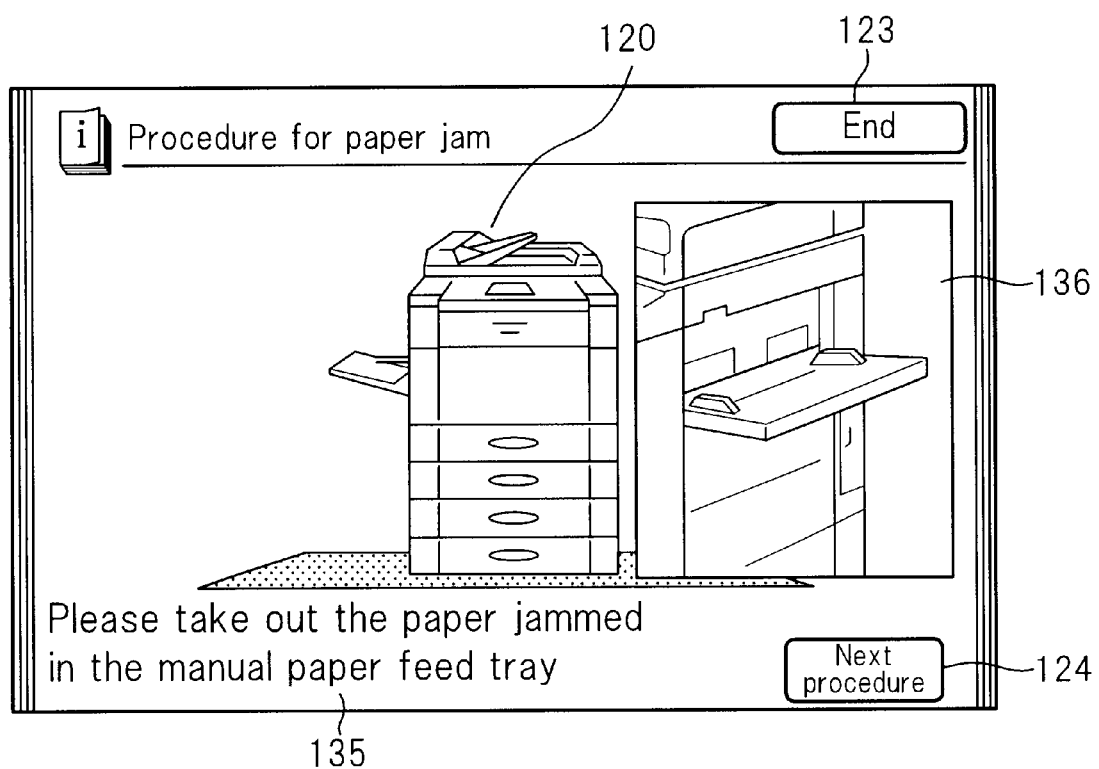
FIG. 27 is a schematic diagram displaying for guidance an enlarged image of the manual paper feed section by partially overlapping it on a portion where the manual paper feed section is located in the sketch drawing of the apparatus body.

Then, as shown in FIG. 25, guidance is given by a message 135 for removing a recording material stagnating in the manual paper feed section of the body. Also here as in the paper ejection section, when the "next procedure" key 124 displayed on the display area on the lower right on the display screen is pushed (touched), as shown in FIG. 26, a portion where the manual paper feed section is located in the sketch drawing 120 of the apparatus body is made clear by a mark M3̂ and the mark M3̂ is blinked several times. Then, as shown in FIG. 27, an enlarged image 136 of the manual paper feed section is partially overlapped and displayed for guidance on a portion where the manual paper feed section is located in the sketch drawing 120 of the apparatus body displayed on the screen of the display device (a portion where the mark M3̂ was blinking on the former screen). At this time, there is a difference on the display form between the sketch drawing 120 of the apparatus and the enlarged image 136, and consideration is given so that the enlarged image 136 is more remarkable than the sketch drawing 120 of the apparatus. For example, it is displayed such that the display density (tone) is made to be thicker in the enlarged image 136 than in the sketch drawing 120 of the apparatus.

Thereby, a user can understand to remove the recording material existing in the manual paper feed section of the apparatus. When removal of the recording material is finished by this display information, removal of the recording material stagnating in the apparatus is completed.

(Method of Recovery of a Document in the Automatic Document Feeder)

Figure 28:
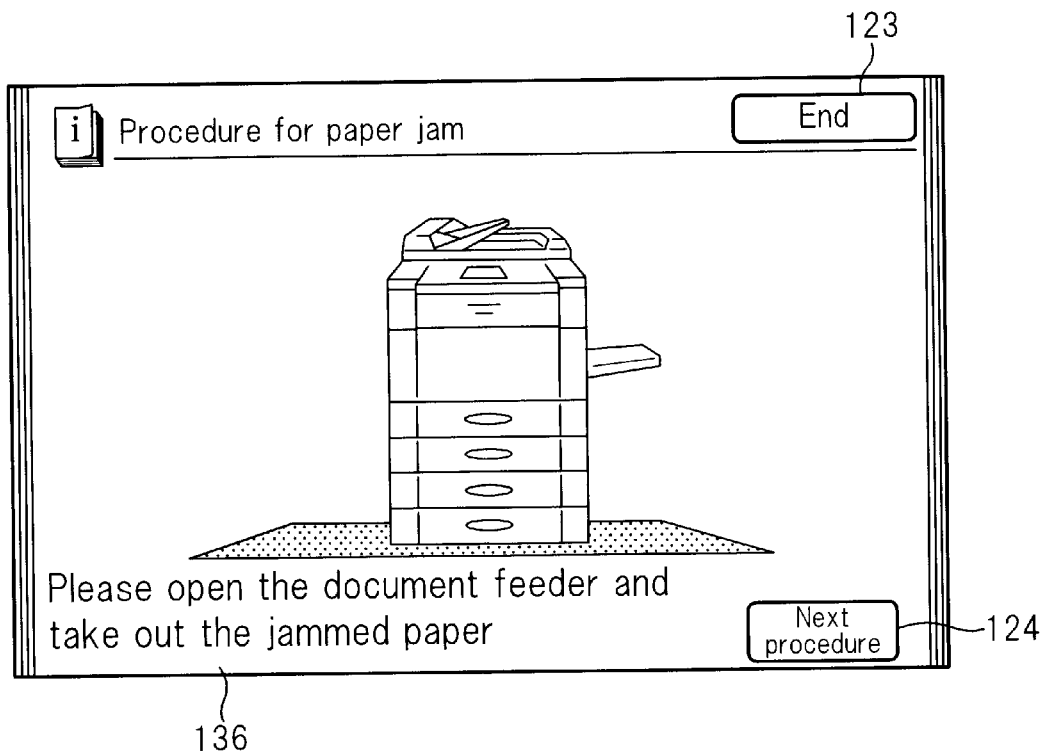
FIG. 28 is a schematic diagram showing a message for taking out an original document jammed in an automatic document feeder.
Figure 29:
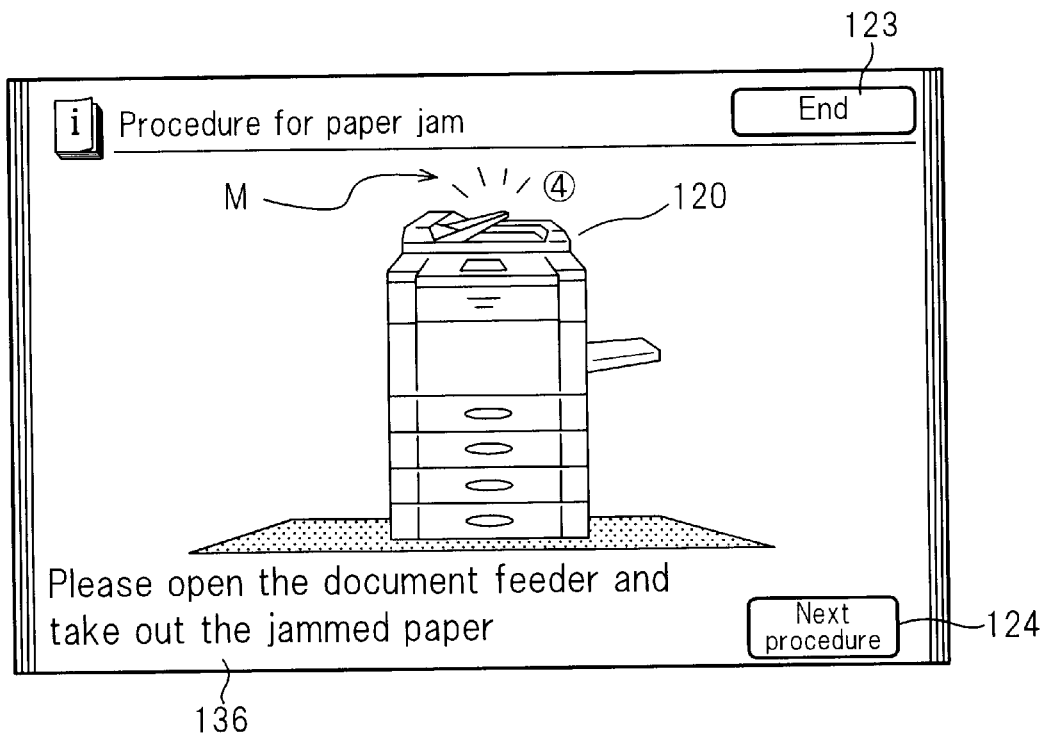
FIG. 29 is a schematic diagram showing with a mark a portion where the automatic document feeder exists in the sketch drawing of the apparatus body.
Figure 30:
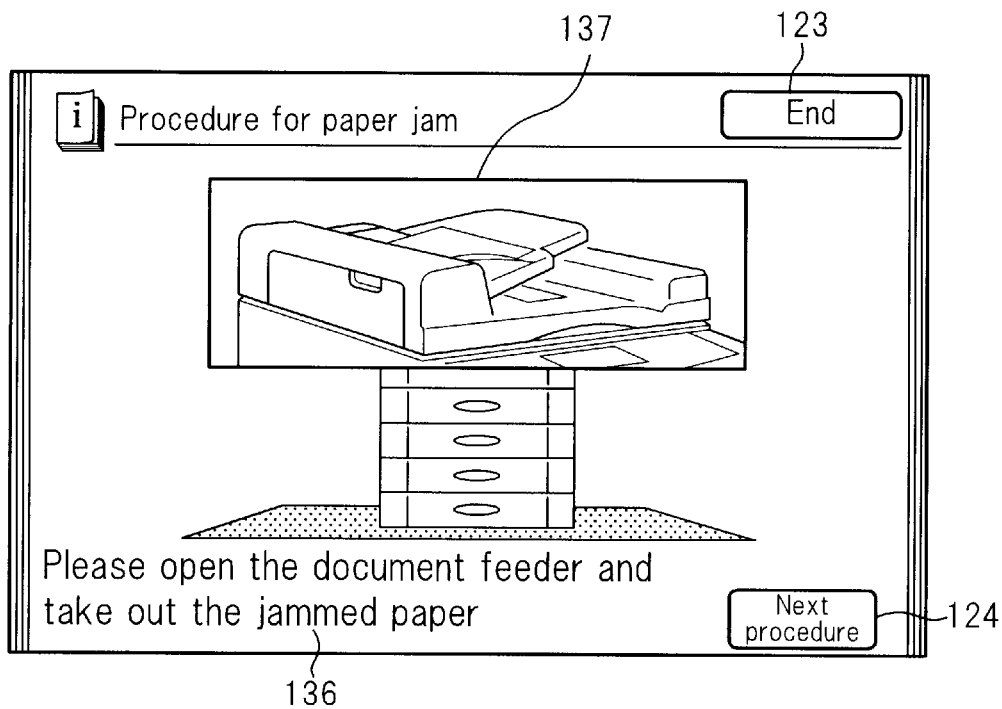
FIG. 30 is a schematic diagram displaying an enlarged image of the automatic document feeder by partially overlapping it on a portion where the automatic document feeder is located in the sketch drawing of the apparatus body.
Figure 31:
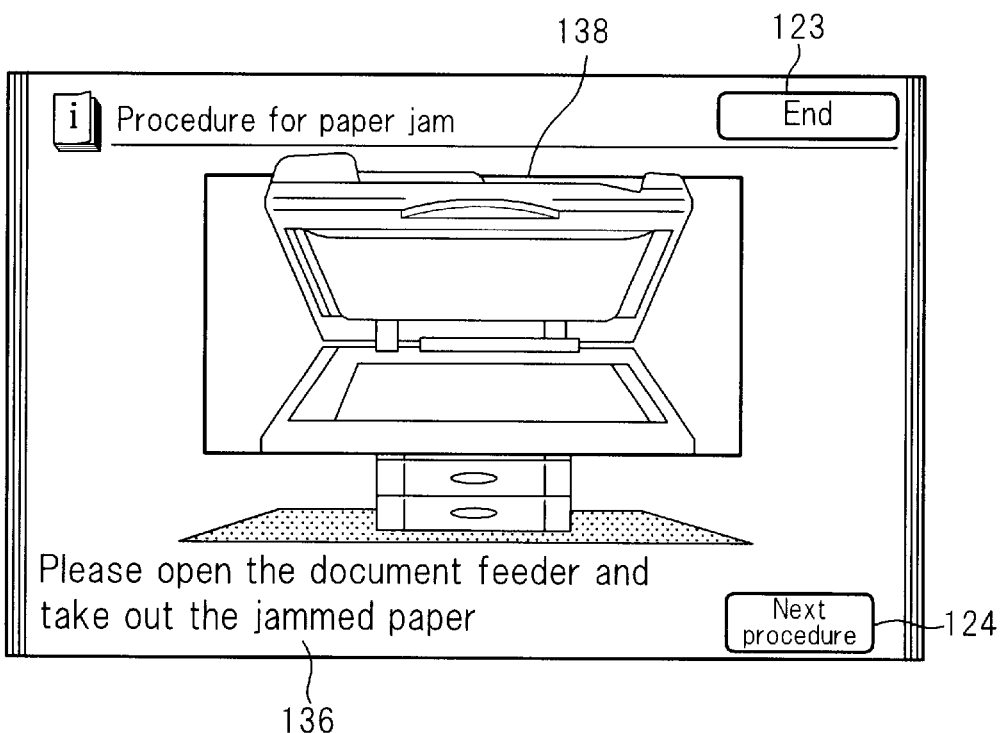
FIG. 31 is a schematic diagram displaying an enlarged image of the automatic document feeder by partially overlapping it on a portion where the automatic document feeder is located in the sketch drawing of the apparatus body.

In the automatic document feeder, similarly as in the above description, guidance is given by a message 136 for taking out a document stagnating in the automatic document feeder, as shown in FIG. 28. Thereafter, when the "next procedure" key 124 displayed on the display area on the lower right on the display screen is pushed (touched), as shown in FIG. 29, a portion where the automatic document feeder is located in the sketch drawing 120 of the apparatus body is made clear by a mark M4̂ (the mark M4̂ is blinked several times). Then, as shown in FIG. 30, an enlarged image 137 of the automatic document feeder is partially overlapped and displayed on a portion where the automatic document feeder is located in the sketch drawing 120 of the apparatus body displayed on the screen of the display device (a portion where the mark M4̂ was blinking on the former screen). Moreover, as shown in FIG. 30 and FIG. 31, guidance is given by a message 136 for taking out the stagnating document by opening the automatic document feeder. At this time, there is a difference on the display form between the sketch drawing 120 of the apparatus and the enlarged images 137 and 138, and consideration is given so that the enlarged images 137, 138 are more remarkable than the sketch drawing 120 of the apparatus. For example, it is displayed such that the display density (tone) is made to be thicker in the enlarged images 137, 138 than in the sketch drawing 120 of the apparatus.

Thereby, a user can understand to open the automatic document feeder 16 located in the upper side of the apparatus and recover the document existing in the document carrier route in the vicinity of the document reading section. When removal of the remaining document is finished by this display information, the automatic document feeder on the upper side of the apparatus is closed, and recovery of the document in the automatic document feeder 16 is completed.

Finally, though not shown this time, if a developer is replenished, image information regarding the replenishment operation of the developer is similarly overlapped and displayed in the vicinity of the display sketch drawing corresponding to the replenishing operation portion of the developer in the apparatus. Moreover, when a recovery container for the waste toner becomes full, image information regarding the replacement operation of the waste toner recovery container is overlapped and displayed in the vicinity of the display sketch drawing corresponding to the replacement operation portion of the waste toner recovery container in the apparatus. Furthermore, when there is no recording material in the recording material supply section where the recording materials are stored, image information regarding the replenishment operation of the recording materials is overlapped and displayed in the vicinity of the display sketch drawing corresponding to the replenishing operation portion of the recording materials in the apparatus.

As described above, by overlapping and displaying the guidance information such as operation method or the like in the vicinity of the portion to be operated in the sketch drawing of the apparatus body, it can be informed precisely which portion of the apparatus should be operated from the displayed sketch drawing of the apparatus body.

It is also possible to provide means for adjusting the level of the difference on the display form between the sketch drawing of the apparatus and the enlarged image displayed on the display device. Thereby, it is possible to make the information to be informed to the user more conspicuous than other information, depending upon the understanding level of the user, to thereby reliably inform the user of the most necessary information.

Next is a description of a mode in which new image information is formed by the dynamic image forming section 105, and a plurality of static image information is sequentially displayed on the display section 56 together with the static image information controlled in the guidance information control section 104, for guidance to the user as continuous guidance image information. Of the above description, description is given to the removal method of a recording material in the paper ejection section. However, the removal method of a recording material in other portions can be also displayed similarly in this mode.

Figure 32A:
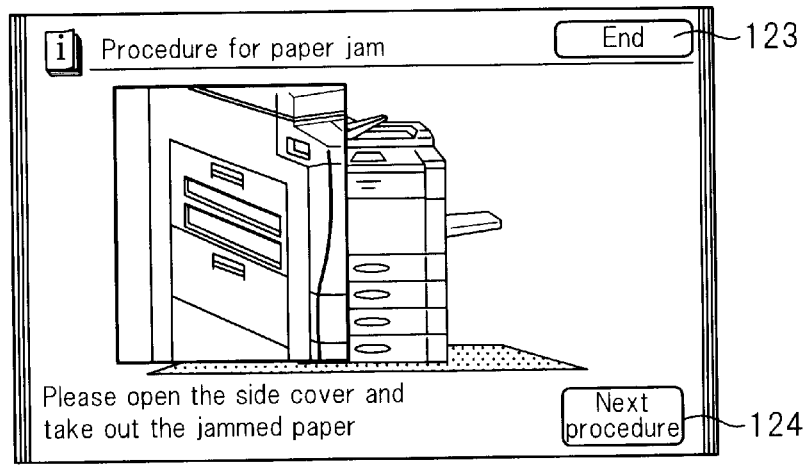
FIGS. 32A to 32C are schematic diagrams showing display image information controlled in a guidance information control section of an image forming apparatus.
Figure 32B:
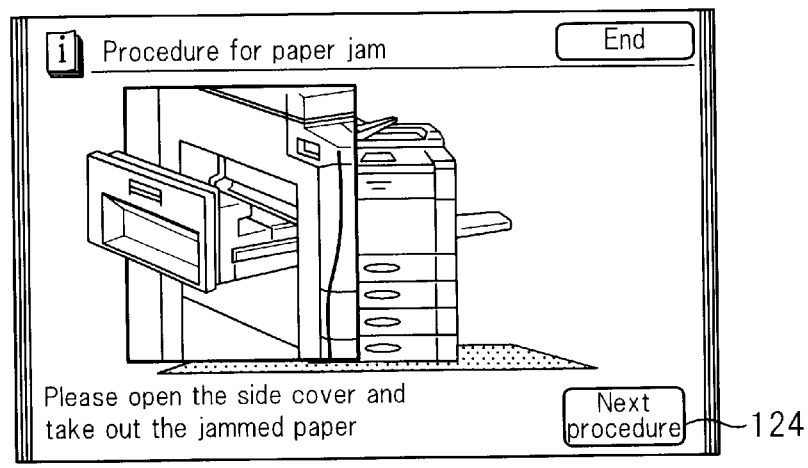
Figure 32C:
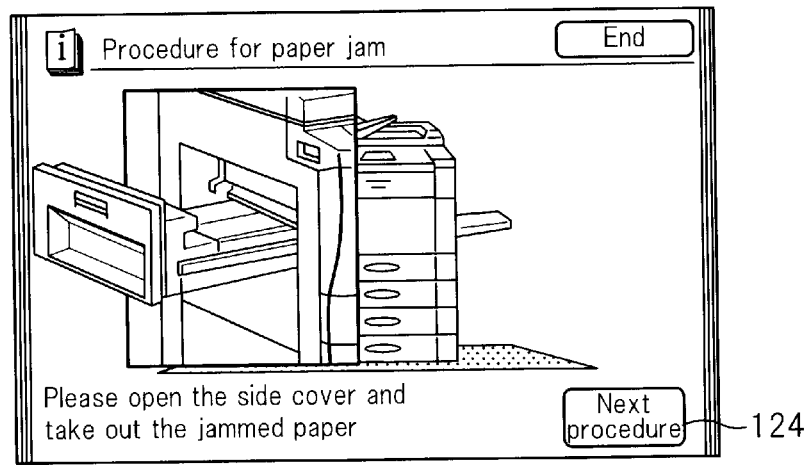

FIGS. 32A, 32B and 32C are display image information controlled in the guidance information control section 104 of the image forming apparatus as the guidance information. When guidance is given by a guidance display so as to remove a recording material jammed in the paper ejection section of the image forming apparatus, (a) is first displayed on the display section 56, and every time the "next procedure" key 124 on the lower right on the display screen is pushed, the display screen is changed from FIG. 32B to FIG. 32C. Moreover, if a user wants to complete the guidance display halfway, pushing of an "end" key 123 on the upper right on the display screen cancels the display guidance of the operation procedure by means of the guidance display.

FIGS. 33 to 41 show a plurality of continuous display image information formed from FIGS. 32A, 32B and 32C, serving as the display image information controlled in the guidance information control section 104 of the image forming apparatus as the guidance information.

Figure 33:
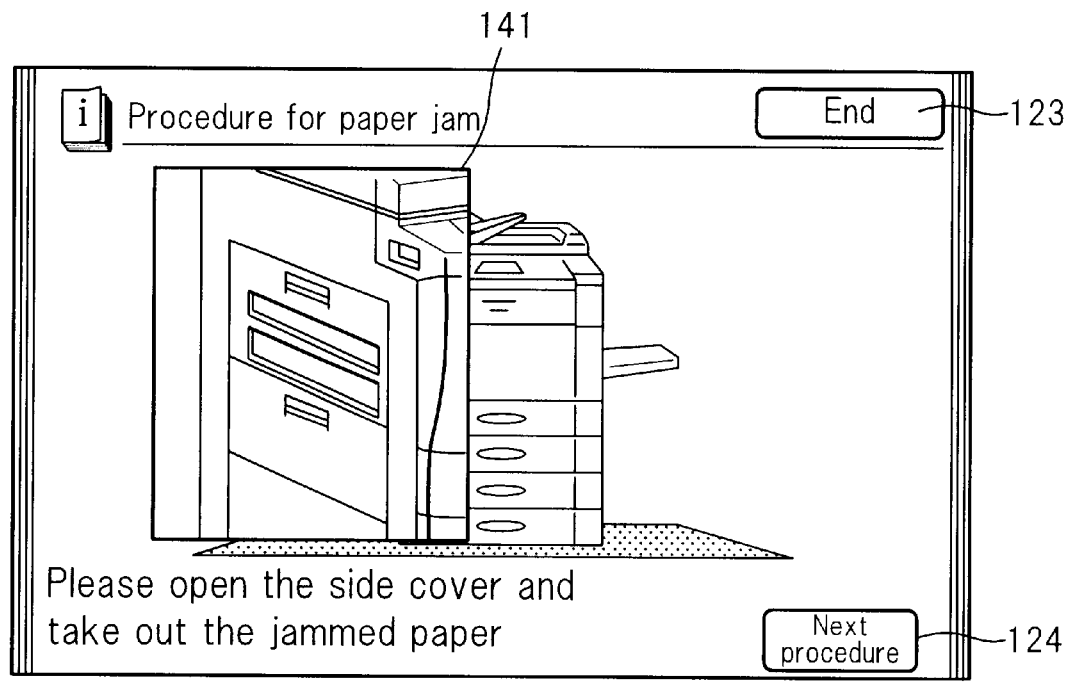
FIG. 33 is a schematic diagram of display image information controlled as guidance information in a guidance information control section of an image forming apparatus.
Figure 37:
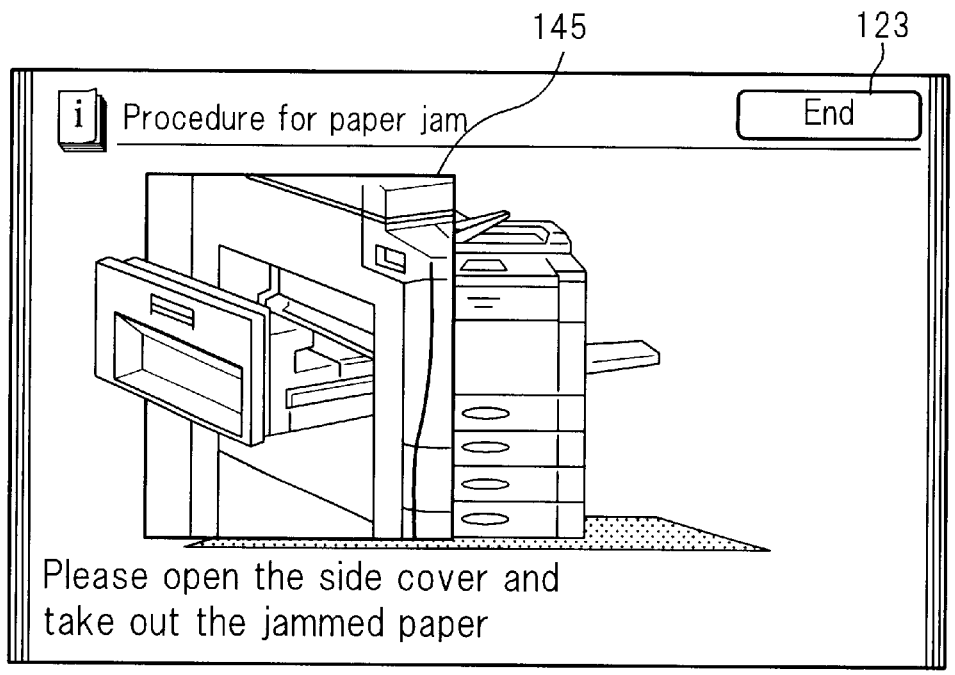
FIG. 37 is a schematic diagram of display image information controlled as guidance information in a guidance information control section of an image forming apparatus.
Figure 41:
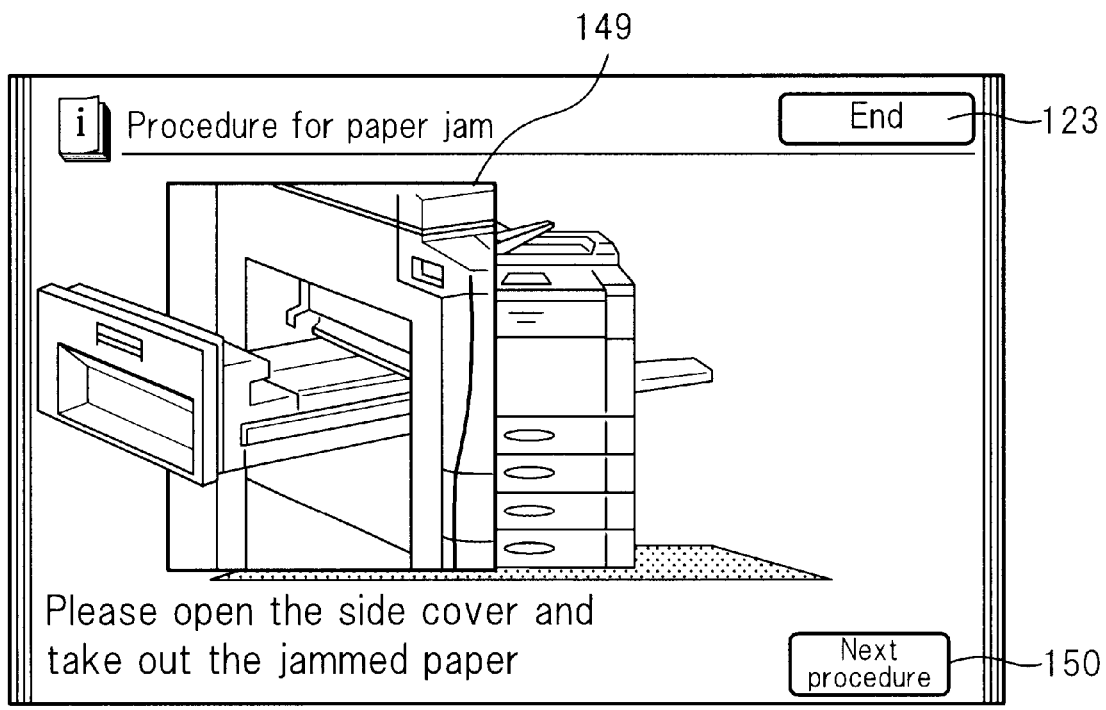
FIG. 41 is a schematic diagram of display image information controlled as guidance information in a guidance information control section of an image forming apparatus.

FIG. 32A corresponds to FIG. 33, FIG. 32B corresponds to FIG. 37, and FIG. 32C corresponds to FIG. 41. When continuous display image information is formed, enlarged images 141, 145 and 149 of FIGS. 33, 37 and 41 controlled in the guidance information control section 104 are used to form other enlarged images, as described with respect to the aforementioned FIGS. 7 and 8. First, an enlarged image 143 of FIG. 35 is formed from enlarges images 141 and 145 of FIG. 33 and FIG. 37, and an enlarged image 147 of FIG. 39 is formed from enlarges images 145 and 149 of FIG. 37 and FIG. 41.

Figure 34:
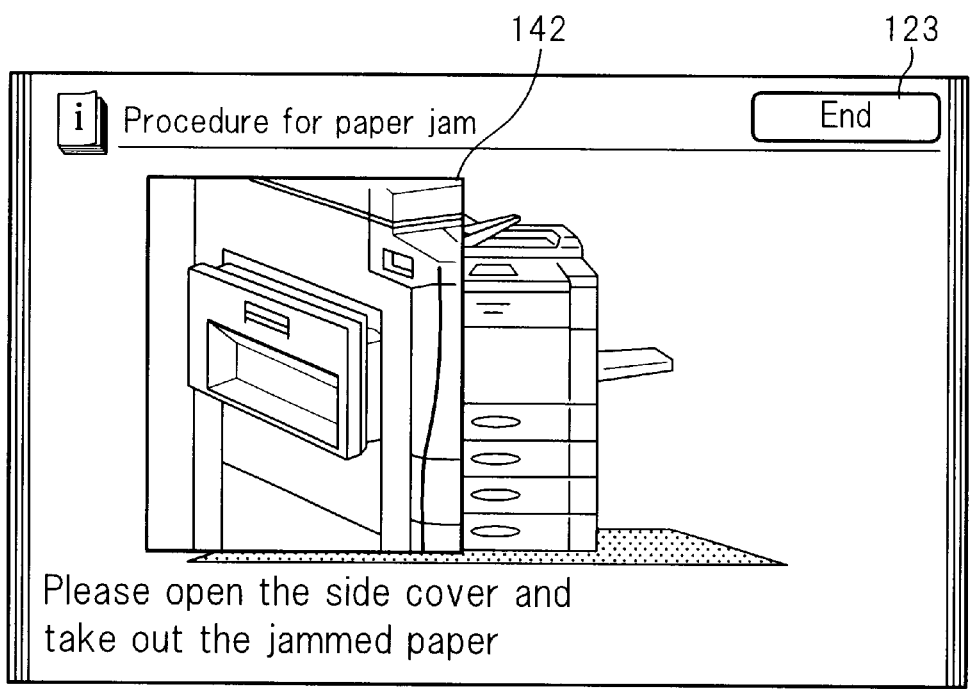
FIG. 34 is a schematic diagram of display image information controlled as guidance information in a guidance information control section of an image forming apparatus.
Figure 35:
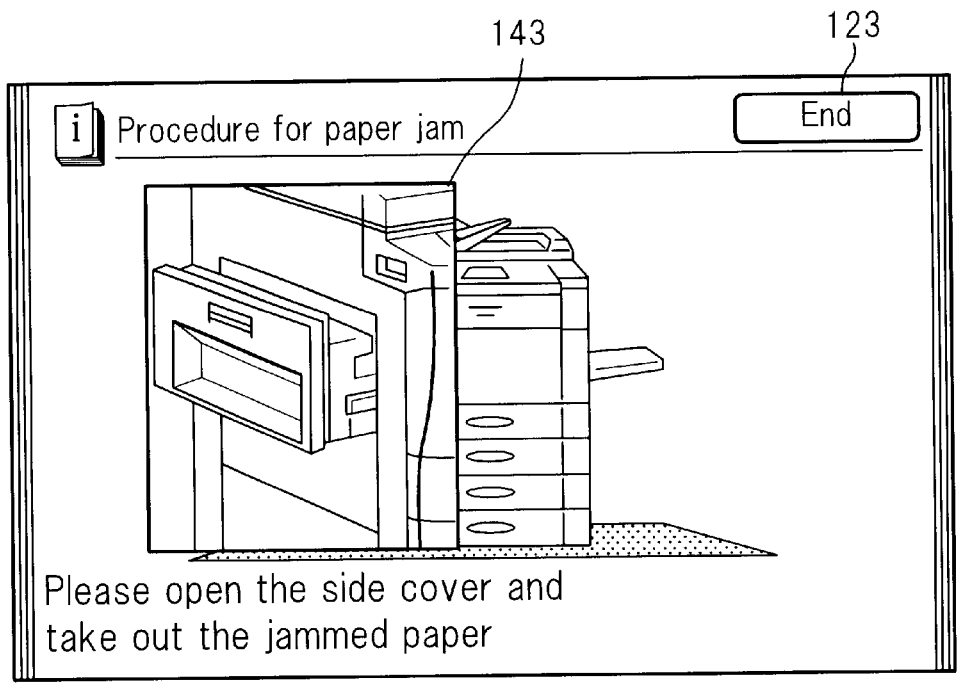
FIG. 35 is a schematic diagram of display image information controlled as guidance information in a guidance information control section of an image forming apparatus.
Figure 36:
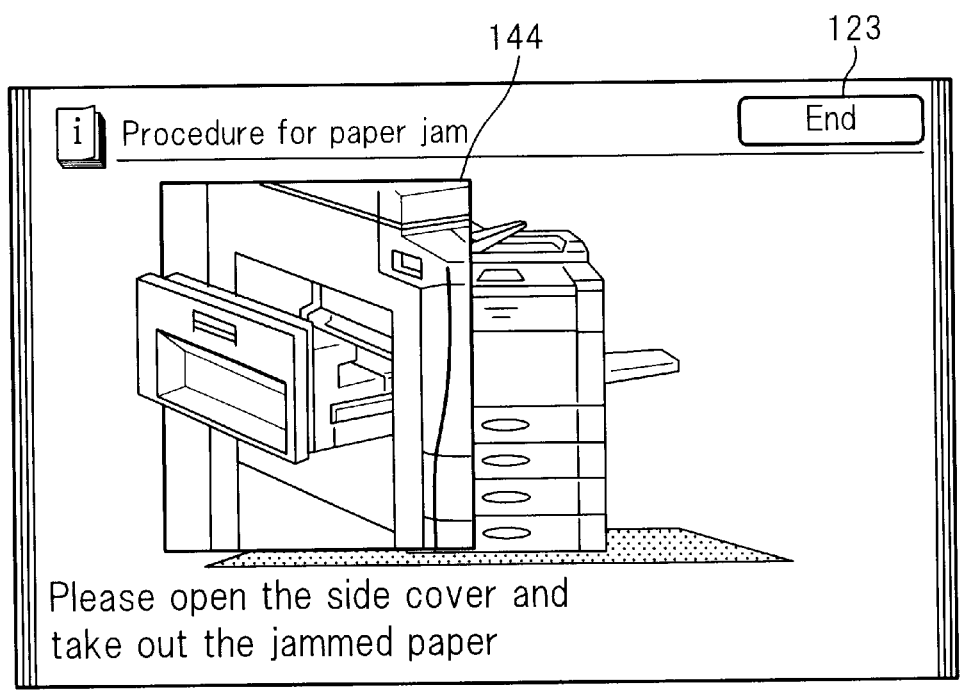
FIG. 36 is a schematic diagram of display image information controlled as guidance information in a guidance information control section of an image forming apparatus.
Figure 38:
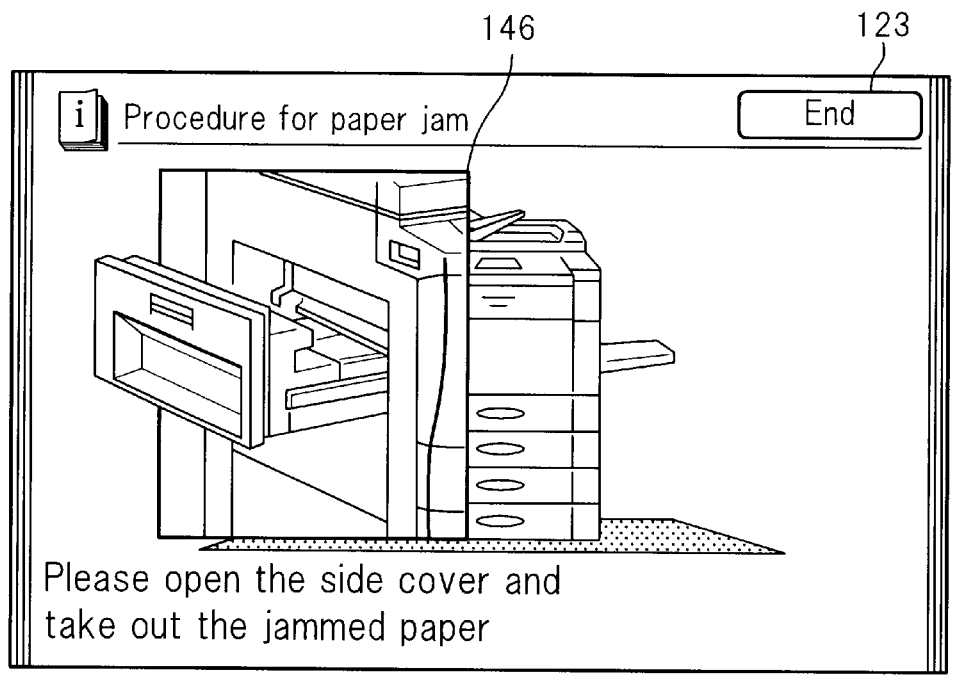
FIG. 38 is a schematic diagram of display image information controlled as guidance information in a guidance information control section of an image forming apparatus.
Figure 39:
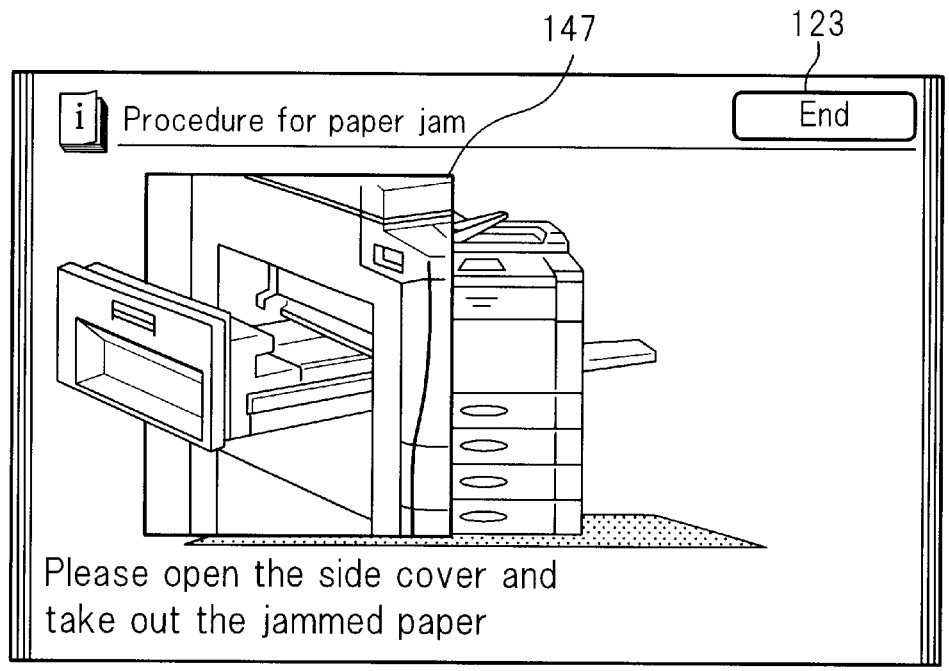
FIG. 39 is a schematic diagram of display image information controlled as guidance information in a guidance information control section of an image forming apparatus.
Figure 40:
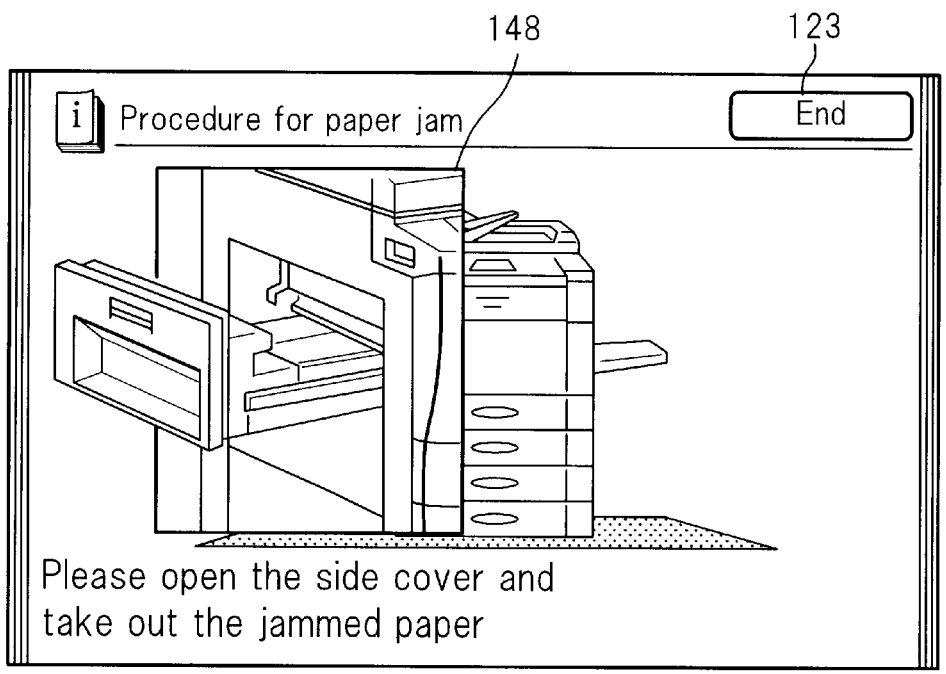
FIG. 40 is a schematic diagram of display image information controlled as guidance information in a guidance information control section of an image forming apparatus.

Next, an enlarged image 142 of FIG. 34 is formed from enlarges images 141 and 143 of FIG. 33 and FIG. 35, an enlarged image 144 of FIG. 36 is formed from enlarges images 143 and 145 of FIG. 35 and FIG. 37, an enlarged image 146 of FIG. 38 is formed from enlarges images 145 and 147 of FIG. 37 and FIG. 39, and an enlarged image 148 of FIG. 40 is formed from enlarges images 147 and 149 of FIG. 39 and FIG. 41, being prepared as continuous display image information from FIG. 33 to FIG. 41. When guidance is given for removing a recording material stagnating in the paper ejection section of the image forming apparatus, first in FIG. 33, the enlarged image 141 is overlapped on the paper ejection section of the sketch drawing 120 of the apparatus and displayed on the display section 56. If the "next procedure" key 124 on the lower right on the display screen is pushed, the display screen is sequentially changed from FIG. 34 to FIG. 41, while changing the enlarged images from 142 to 149.

Moreover, when it is desired to end the guidance display halfway, pushing of the "end" key 123 on the upper right on the display screen cancels the display guidance of the operation procedure by means of the guidance display. In addition, after the guidance display by means of a series of display image information has been completed, if it is desired to confirm it again, pushing of a "repeat" key 150 on the lower right on the display screen causes to display the guidance again.

As described above, it becomes possible to display the information regarding the apparatus in a dynamic image, hence it is possible to provide users the information of operation method easy to understand, even if it is an electronic equipment having multiple complex functions. Moreover, the total memory capacity can be reduced, since the apparatus uses a memory area for controlling static images serving as a point, and a work memory area for temporarily storing the images formed from these static images to accomplish the operation, compared to an apparatus which stores display image information in a dynamic image in the memory of the apparatus.

Description has heretofore been made for the operation panel provided in the digital copying machine 10, however, it is possible to connect a personal computer (PC) 151 to the digital copying machine 10 for processing the image data, as shown in FIG. 42. Here, PC is mentioned, but any computer which can process image data may be used.

In this case, the guidance information control means is in the digital copying machine 10, and stores the static images A and B. These static images are transmitted to the PC 151 through a signal line, radio transmission or the like. PC 151 performs a role of the image forming means, and forms dynamic data by interpolation using a dynamic image forming software installed therein, to thereby perform dynamic image display on the PC screen. Alternatively, the dynamic data is transmitted back to the digital copying machine 10 so that dynamic image display is performed on the digital copying machine side.

Thereby, a dynamic image forming software needs not be provided on the digital copying machine side, hence the memory space of the digital copying machine is not pressed. Furthermore, with the PC 151, it is not necessary to store the static image data for each model of the digital copying machine 10.

According to the present invention, in which part of the apparatus a change (problem, trouble, etc.) occurred is partially displayed with respect to the sketch drawing of the entire apparatus, hence it is easy to understand. Moreover, compared to the conventional method of display by changing the whole display, the information quantity (data volume) of each display image information becomes small, reducing the memory capacity for controlling the display image information, hence it is advantageous in view of the cost. Furthermore, even if the apparatus has the memory capacity similar to that of the conventional apparatus without reducing the memory capacity, since the data volume of one display image information is small, many display image information can be stored and controlled, enabling more detailed guidance. Thereby, even if the apparatus becomes complicated due to having high performance and multifunctions, it is possible to provide appropriate guidance information without confusing the user.

According to the first gist, when a change occurs in the status of the equipment to be operated, the status information is overlapped and displayed on a portion of the sketch drawing of the equipment to be operated where the status change occurred. Hence, the user can reliably confirm all the information (points) only by watching approximately the same position (display area).

According to the second gist, the status information showing a status change is displayed so as to leave at least a part of the sketch drawing of the equipment to be operated by the display control section, hence it becomes easy to understand in which part of the equipment to be operated the status change occurred, or how to operate which part of the equipment to be operated.

According to the third gist, since the status information is displayed in the vicinity of a portion of the sketch drawing of the equipment to be operated where the status change occurred, the portion of the sketch drawing where the status change occurred is not hidden by the status information, making it easy for an operator to confirm.

According to the fourth gist, since the status information is a partially enlarged diagram of a portion of the apparatus where a status change occurred, the operator can clearly understand the portion that the status information shows.

According to the fifth and sixth gist, since the status information is a plurality of transition display information regarding the handling method with respect to the portion where the status change occurred, and the plurality of transition display information is transitionally displayed approximately in the same position in the sketch drawing of the equipment to be operated, a series of handling procedure can be displayed easily to understand for the operator.

According to the seventh to ninth gist, the sketch drawing of the equipment to be operated is maintained and displayed in a predetermined position on the display screen area of the display section, therefore, when the status information is displayed, the operator can quickly understand which portion in the sketch drawing it is.

According to the tenth to twelfth gist, since the display forms of the sketch drawing of the equipment to be operated and the status information are different, the operator can quickly distinguish the status information.

According to the thirteenth and fourteenth gist, since the status information is displayed on the display section in a state of being emphasized than the sketch drawing, the information display device becomes easy to understand for the operator.

According to the fifteenth and sixteenth gist, since the difference on the display form of the sketch drawing of the equipment to be operated and the status information on the display section can be optionally set, the difference (hue, density, etc.) on the display form of a plurality of information displayed on the display device can be adjusted (automatically or manually). Hence, the difference is adjusted depending upon the environment of the place where the apparatus is installed, such as the level of users (understanding level of the apparatus, etc.), enabling provision of an apparatus easy to understand.

According to the seventeenth gist, the image forming section forms, from two static image information, at least one interpolated image information corresponding to the state during the status change, and sequentially displays the image information, in response to the operation of an operator, thereby enabling guidance of a series of operation procedure. Hence, it becomes possible to display the information regarding the apparatus in a dynamic image, and even if it is an electronic equipment having multiple functions, the information of an easy operation method or the like can be provided to users. Moreover, since this operation can be accomplished by using a memory area for controlling the static image serving as a point and a work memory area for temporarily storing the image formed from the static image, the total memory capacity can be made small, compared to an apparatus which stores the display image information in a dynamic image in the memory.

According to the eighteenth gist, since the guidance information control section stores and controls static image information in which the display position of a portion not interpolated and displaced is fixed and the display position of a displaced portion is changed in the image forming section. Therefore, the formed image can be obtained only by changing the display position of the displaced portion, making the movement smooth, enabling provision of information to the user easily to understand.

According to the nineteenth gist, the guidance information control section controls the information by dividing them into background image information in which there is no change on the display position, and changed image information in which the display position changes, and the image forming section forms at least one interpolated image information from at least two changed image information, corresponding to the state during the change, enabling suppression of the memory area for controlling the guidance image information to a minimum.

According to the twentieth gist, the guidance information control section controls the information by dividing them into background image information in which there is no change on the display position, and displacement data of a portion where the display position changes, and the image forming section forms a partially interpolated image information representing the displaced state, based on the displacement data, and synthesizes the partially interpolated image information and the background image information, enabling suppression of the memory area for controlling the guidance image information to a minimum.

According to the twenty-first gist, a guidance information control section is provided also in a peripheral equipment connected to the equipment to be operated, and the peripheral guidance information control section controls at least two static image information showing a status change of the peripheral equipment. When the peripheral equipment is connected to the equipment to be operated, as required, the information controlled therein can be transferred as new display image information, hence the equipment to be operated has only to control the necessary minimum display image information.

According to the twenty-second gist, since the display image information newly including the equipment to be operated and a peripheral equipment is transferred to the image forming section and displayed, guidance display becomes possible with proper display image information and with simple processing.

According to the twenty-third gist, the static image information controlled in the peripheral guidance information control section is preferentially displayed as new image information, without invalidating the image information corresponding to the equivalent portion controlled in the guidance information control section. Hence, even if the peripheral equipment is detached, dynamic image display is possible using only the equipment to be operated.

According to the twenty-fourth gist, the guidance information control section is provided in the equipment to be operated, the image forming section is provided outside of the equipment to be operated, and the image information in the guidance information control section is transmitted to the image forming apparatus to thereby form an image. Hence, the function of the equipment to be operated can be reduced, enabling reduction in the number of parts. Moreover, the image forming section may be a dedicated processing unit for forming images, thereby enabling improvement in the operation efficiency, as well as correspondence to each model of the equipment to be operated.

According to the twenty-fifth and twenty-sixth gist, it is possible to select information guidance by section of a static image or information guidance by section of a dynamic image, in compliance with the demands of the operator. Therefore, depending upon the environment of the place where the apparatus is installed, it becomes possible to change the display form of the information displayed for guidance on the display section on the operation panel.

According to the twenty-seventh to the thirtieth gist, since the image forming section is constituted so as to be added as an extended unit, and can be additionally operated selectively, it becomes possible to change the display form of the information displayed for guidance on the display section on the operation panel, depending upon the environment of the place where the apparatus is installed and/or the demands of a user, enabling guidance display easy to understand.

What is claimed is:

1. An information display device comprising:
   a display section for displaying guidance information of operation to an operator, regarding equipment to be operated;
   a guidance information control section for storing and controlling a plurality of said guidance information to be displayed in said display section; and
   a display control section for selectively displaying said guidance information controlled in said guidance information control section in said display section;
   wherein said guidance information includes a sketch drawing of the entire equipment to be operated and status information representing a status change of the equipment to be operated;
   when the status change occurs in said equipment to be operated, said display control section displays said status information with respect to the status change, by overlapping said status information on a part of said sketch drawing which has been displayed; and
   wherein said status information is a partially enlarged diagram of a portion of the equipment to be operated where the status change occurred.

2. An information display device according to claim 1, wherein said display control section displays said status information so as to leave at least a part of said sketch drawing.

3. An information display device according to claim 1, wherein said status information is a plurality of transition display information regarding a method of handling the portion where the status change occurred, and said plurality of transition display information are transitionally displayed approximately in the same position in said sketch drawing.

4. An information display device according to claim 3, wherein said sketch drawing is maintained and displayed in a predetermined position on a display screen area of said display section.

5. An information display device according to claim 3, wherein the display forms of said sketch drawing and said status information are respectively different.

6. An information display device according to claim 5,
   wherein said status information is displayed on said display section in a state of being emphasized relative to said sketch drawing.

7. An information display device according to claim 5,
   wherein the difference of the display form in said display section of said sketch drawing and said status information may be optionally set.

8. An information display device according to claim 5, wherein
   said status information is displayed on said display section in a state of being emphasized relative to said sketch drawing.

9. An information display device according to claim 5, wherein
   the difference of the display form in said display section of said sketch drawing and said status information can be optionally set.

10. An information display device according to claim 1, wherein said sketch drawing is maintained and displayed in a predetermined position on a display screen area of said display section.

11. An information display device according to claim 1, wherein the display forms of said sketch drawing and said status information are respectively different.

12. An information display device according to claim 11,
    wherein said status information is displayed on said display section in a state of being emphasized relative to said sketch drawing.

13. An information display device according to claim 11,
    wherein the difference of the display form in said display section of said sketch drawing and said status information may be optionally set.

14. An information display device according to claim 1,
    further comprising an image forming section for forming, from at least two static image information showing the status change of said equipment to be operated, at least one interpolated image information corresponding to a state during the status change;
    wherein said status information is an interpolated partially enlarged diagram formed by said image forming section based on at least two partially enlarged diagrams.

15. An information display device according to claim 14, wherein said guidance information control section stores and controls static image information in which the display position of a portion not interpolated and displaced is fixed and the display position of a displaced portion is changed in said image forming section.

16. An information display device according to claim 14, wherein said guidance information control section controls the information by dividing them into background image information in which there is no change in display position, and changed image information in which the display position changes, and said image forming section forms at least one interpolated image information from at least two changed image information, corresponding to the state during the change, and synthesizes the interpolated image information with the background image information.

17. An information display device according to claim 14, wherein said guidance information control section controls the information by dividing them into background image information in which there is no change in the display position, and displacement data of a portion where the display position changes, and said image forming section forms a partially interpolated image information representing the displaced state, based on the displacement data, and synthesizes said partially interpolated image information and said background image information.

18. An information display device according to claim 14, wherein a guidance information control section is provided also in a peripheral equipment connected to the equipment to be operated, and said peripheral guidance information control section controls at least two static image information showing status change of said peripheral equipment, and the image forming section forms at least one image information corresponding to the image during the status change from said at least two image information.

19. An information display device according to claim 18, wherein the static image information controlled in said peripheral guidance information control section is image information including image information of the equipment to be operated and a peripheral equipment.

20. An information display device according to claim 19, wherein the static image information controlled in said peripheral guidance information control section is preferentially displayed as on the display section, without invalidating said guidance information controlled in the guidance control section of the equipment to be operated.

21. An information display device according to claim 14, wherein said guidance information control section is provided in said equipment to be operated, said image forming section is provided in an image forming apparatus positioned outside of the equipment to be operated, and the image information in said guidance information control section is transmitted to said image forming apparatus to thereby form an image.

22. An information display device according to claim 21, wherein said display control section is provided with a first information display mode for displaying only the information controlled in said guidance information control section on the display section, and a second information display mode for displaying the information including the image information formed by said image forming section on the display section, thereby enabling the selection of one of these.

23. An information display device according to claim 22, wherein said image forming section is constituted so as to be added as an extended unit, and hence can be additionally operated selectively.

24. An information display device according to claim 21, wherein
said image forming section is constituted so as to be added as an extended unit, and hence can be additionally operated selectively.

25. An information display device according to claim 14, wherein said display control section is provided with a first information display mode for displaying only the information controlled in said guidance information control section on the display section, and a second information display mode for displaying the information including the image information formed by said image forming section on the display section, thereby enabling the selection of one of these.

26. An information display device according to claim 25, wherein
said image forming section is constituted so as to be added as an extended unit, and hence can be additionally operated selectively.

27. An information display device according to claim 14, wherein said image forming section is constituted so as to be added as an extended unit, and hence can be additionally operated selectively.

28. An information display device comprising:

a display section for displaying guidance information of operation to an operator, regarding equipment to be operated;

a guidance information control section for storing and controlling a plurality of said guidance information to be displayed in said display section; and a display control section for selectively displaying said guidance information controlled in said guidance information control section in said display section;

wherein said guidance information includes a sketch drawing of the entire equipment to be operated and status information representing a status change of the equipment to be operated;

when the status change occurs in said equipment to be operated, said display control section displays said status information with respect to the status change in the vicinity of a portion of said sketch drawing where the status change occurred, with said sketch drawing of the entire equipment to be operated being displayed; and wherein said status information is a partially enlarged diagram of a portion of the equipment to be operated where the status change occurred.

29. An information display device comprising:

a display section for displaying guidance information of operation to an operator, regarding equipment to be operated;

a guidance information control section for storing and controlling a plurality of said guidance information to be displayed in said display section; and a display control section for selectively displaying said guidance information controlled in said guidance information control section in said display section;

wherein said guidance information includes a sketch drawing of the entire equipment to be operated and status information representing a status change of the equipment to be operated;

when the status change occurs in said equipment to be operated, said display control section displays said status information with respect to the status change, by overlapping said status information on a part of said sketch drawing which has been displayed;

wherein said status information is a partially enlarged diagram of a portion of the equipment to be operated where the status change occurred; and wherein before displaying said status information, said sketch drawing displays a mark indicating a position where the status change has occurred.

30. An information display device comprising:
- a display section for displaying guidance information of operation to an operator, regarding equipment to be operated;
- a guidance information control section for storing and controlling a plurality of said guidance information to be displayed in said display section; and
- a display control section for selectively displaying said guidance information controlled in said guidance information control section in said display section;
- wherein said guidance information includes a sketch drawing of the entire equipment to be operated and status information representing a status change of the equipment to be operated;
- when the status change occurs in said equipment to be operated, said display control section displays said status information with respect to the status change in the vicinity of a portion of said sketch drawing where the status change occurred, with said sketch drawing of the entire equipment to be operated being displayed;
- wherein said status information is a partially enlarged diagram of a portion of the equipment to be operated where the status change occurred; and
- wherein before displaying said status information, said sketch drawing displays a mark indicating a position where the status change has occurred.

* * * * *